United States Patent
Wang et al.

(10) Patent No.: US 9,479,776 B2
(45) Date of Patent: Oct. 25, 2016

(54) SIGNALING OF LONG-TERM REFERENCE PICTURES FOR VIDEO CODING

(71) Applicant: Qualcomm Incorporated, San Diego, CA (US)

(72) Inventors: Ye-Kui Wang, San Diego, CA (US); Adarsh Krishnan Ramasubramonian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 514 days.

(21) Appl. No.: 13/929,052

(22) Filed: Jun. 27, 2013

(65) Prior Publication Data
US 2014/0003506 A1  Jan. 2, 2014

Related U.S. Application Data

(60) Provisional application No. 61/667,371, filed on Jul. 2, 2012.

(51) Int. Cl.
*H04N 7/32* (2006.01)
*H04N 19/50* (2014.01)
(Continued)

(52) U.S. Cl.
CPC ...... *H04N 19/00569* (2013.01); *H04N 19/463* (2014.11); *H04N 19/70* (2014.11); *H04N 19/58* (2014.11)

(58) Field of Classification Search
CPC .............................................. H04N 19/00515
USPC ....................................... 375/240.01, 240.12
See application file for complete search history.

(56) References Cited

U.S. PATENT DOCUMENTS 6,529,550 B2  3/2003  Tahara et al.
6,674,477 B1  1/2004  Yamaguchi et al.
(Continued)

FOREIGN PATENT DOCUMENTS

EP  1496707 A1  1/2005
WO  2008084443 A1  7/2008
(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
(Continued)

*Primary Examiner* — Yulin Sun
(74) *Attorney, Agent, or Firm* — Shumaker & Sieffert, P.A.

(57) ABSTRACT

In one example, a device for decoding video data includes a video decoder configured to decode a value representative of a difference between most significant bits (MSBs) of a reference picture order count (POC) value and MSBs of a long-term reference picture (LTRP) POC value, wherein the reference POC value corresponds to a picture for which data must have been received in order to properly decode a current picture, determine the MSBs of the LTRP POC value based on the decoded value and the reference POC value, and decode at least a portion of the current picture relative to the LTRP based at least in part on the LTRP POC value. The picture for which data must have been received in order to properly decode a current picture may correspond to the current picture itself or a most recent random access point (RAP) picture.

45 Claims, 7 Drawing Sheets

(51) Int. Cl.
*H04N 19/70* (2014.01)
*H04N 19/463* (2014.01)
*H04N 19/58* (2014.01)

(56) References Cited

U.S. PATENT DOCUMENTS

| | | | |
|---|---|---|---|
| 7,706,667 B2 | 4/2010 | Mae et al. | |
| 7,724,818 B2 | 5/2010 | Hannuksela et al. | |
| 8,107,539 B2 | 1/2012 | Hannuksela et al. | |
| 8,693,539 B2 | 4/2014 | Lim et al. | |
| 8,958,486 B2 | 2/2015 | Rodriguez et al. | |
| 2007/0030894 A1 | 2/2007 | Tian et al. | |
| 2007/0110390 A1 | 5/2007 | Toma | |
| 2007/0223582 A1 | 9/2007 | Borer | |
| 2009/0148057 A1 | 6/2009 | Chen et al. | |
| 2010/0008420 A1 | 1/2010 | Lin | |
| 2010/0254456 A1 | 10/2010 | Matsushita et al. | |
| 2011/0090921 A1 | 4/2011 | Anthru et al. | |
| 2012/0230433 A1 | 9/2012 | Chen et al. | |
| 2012/0307911 A1 | 12/2012 | Dachiku | |
| 2013/0022104 A1 | 1/2013 | Chen et al. | |
| 2013/0058408 A1 | 3/2013 | Wahadaniah et al. | |
| 2013/0070841 A1 | 3/2013 | Wahadaniah et al. | |
| 2013/0222538 A1 | 8/2013 | Chen et al. | |
| 2013/0235152 A1 | 9/2013 | Hannuksela et al. | |
| 2013/0272619 A1 | 10/2013 | Deshpande | |
| 2013/0279564 A1 | 10/2013 | Wang | |
| 2013/0279575 A1 | 10/2013 | Wang | |
| 2013/0279599 A1 | 10/2013 | Wang | |
| 2014/0126640 A1* | 5/2014 | Samuelsson | H04N 19/00515 375/240.16 |

FOREIGN PATENT DOCUMENTS

| | | |
|---|---|---|
| WO | 2013002700 A1 | 1/2013 |
| WO | 2013006114 A2 | 1/2013 |
| WO | 2013030456 A1 | 3/2013 |

OTHER PUBLICATIONS

Boyce, et al., "Extensible High Layer Syntax for Scalability," MPEG Meeting; Mar. 21, 2011-Mar. 25, 2011; Geneva; (Motion Picture Expert Group or ISO/IEC JTC1/SC29/WG11), No. m19806, XP030048373, 10 pp.

Bross, et al., "High Efficiency Video Coding (HEVC) text specification draft 10 (for FDIS & Consent)", MPEG Meeting; Jan. 21, 2013-Jan. 25, 2013; Geneva; (Motion Picture Expert Group or ISO/IEC JTC1/SC29/WG11), No. m28292, XP030056838, 332 pp. [uploaded in parts].

Bross, et al., "High efficiency video coding (HEVC) text specification draft 10 (For FDIS & Last Call)," 12th Meeting: Geneva, CH, Jan. 14-23, 2013, JCTVC-L1003_v34, 310 pp.

Bross, et al., "High Efficiency Video Coding (HEVC) text specification draft 7," JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-I1003_d0, XP030112373, 270 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross, et al., "WD6: High Efficiency Video Coding (HEVC) text specification draft 6 (version JCTVC-H1003_dA)", Joint Collaborative Team on Video Coding (JCT-VC) of ITU-T SG16 WP3 and ISO/IEC JTC1/SC29/WG11 7th Meeting: Geneva, CH, Nov. 21-30, 2011, XP55054460, 239 pp. [uploaded in parts].

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "AHG15: Conforming bitstreams starting with CRA pictures", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG. 16); URL: http://wftp3.itu.int/av-arch/jctvc-site/, No. JCTV-G319, XP030110303, 6 pp.

Deshpande et al., "AHG21: Comments on Signaling of reference picture," JCT-VC Meeting; MPEG Meeting; Feb. 1, 2012-Feb. 10, 2012; San Jose; (Joint Collaborative Team on Video Coding of ISO/IEC JTCI/ SC29/WG11 and ITU-T SG.16); URL: http://wftp3.itu.int/av-arch/ jctvc-site/,, No. JCTVC-H0531, XP030111558, 5 pp.

Deshpande, et al., "HRD Buffering for Bitstreams Starting with CRA Picture," Joint Collaborative Team on Video Coding (JCT-VC) of ITU-T SG16 WP3 and ISO/IEC JTC1/SC29/WG11, 9th Meeting: Geneva, Switzerland, Apr. 27-May 7, 2012, Document: JCTVC-I0277, WG11 No. m24524, 7 pp.

Deshpande "On Random Access Point Picture Signaling", JCT-VC Meeting; MPEG Meeting; Oct. 10, 2012-Oct. 19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/, No. JCTVC-K0219, XP030113101, 8 pp.

Fujibayashi et al: "Random access support for HEVC", JCT-VC Meeting; MPEG Meeting; Jan. 20, 2011-Jan. 28, 2011; Daegu;(Joint Collaborative Team on Video Coding of ISO/IEC JTC1/SC29/WG11and ITU-T SG.16 ); URL: http://wftp3.itu.int/av-arch/jc tvc-site/, No. JCTVC-D234, XP030008274, ISSN: 0000-0013, 8 pp.

Fujibayashi et al., "Random access support for HEVC", MPEG Meeting; Jan. 24, 2011-Jan. 28, 2011; Daegu; (Motion Picture Expert Group or ISO/IEC JTC1/SC29/WG11),No. m18994, XP030047563.

Hendry, et al., "AHG 9: On random access point NAL units", JCT-VC Meeting; MPEG Meeting; Oct. 10, 2012-Oct. 19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/, No. JCTVC-K0166, XP030113048, 8 pp.

International Search Report and Written Opinion—PCT/US2013/048687—ISA/EPO—Aug. 30, 2013, 13 pp.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Ramasubramonian, et al., "AHG13: Signalling of long-term reference pictures in the slice header", JCT-VC Meeting; MPEG Meeting; Jul. 11, 2012-Jul. 20, 2012; ;Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0115, XP030112477, 11 pp.

Ramasubramonian et al., "AHG15: Signalling of long-term reference pictures in the SPS", JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-10340, XP030112103, 6 pp.

Suehring (HHI) K., "AHG11: High level syntax parsing issues", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16 ); URL: http:// wftp3.1tu.int/av -arch/jctvc-site/,No. JCTVC-10113, Apr. 16, 2012, XP030111876.

(56) References Cited

OTHER PUBLICATIONS

Sullivan, "CRA pictures with broken links", MPEG Meeting; Apr. 30, 2012-May 4, 2012; Geneva; (Motion Picture Expert Group or ISO/IEC JTC1/SC29/WG11), No. m24653, XP030052996, 3 pp.

Wang, et al., "AHG15: On reference picture set derivation and LTRP signaling in Slice header," JCT-VC Meeting; 100. MPEG Meeting; Feb. 27, 2012-May 7, 2012; Geneva; ((Joint Collaborative Team on Video Coding of ISO/IEC JTCI/ SC29/WG11 and ITU-T SG.16); URL: http://wftp3.itu.int/av-arch/ jctvc-site/, No. JCTVC-I0342, XP030112105, 6 pp.

Wang, et al., "AHG21: On DPB management", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G314, XP030110298, 7 pp.

Wang, et al., "AHG9: Splicing-friendly coding of some parameters", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0108, XP030112470, 5 pp.

Wang, et al., "On parameter sets," Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document: JCTVC-I0338, 6 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2013/048687, dated Jul. 11, 2014, 6 pp.

International Preliminary Report on Patentability from International Application No. PCT/US2013/048687, dated Sep. 16, 2014, 10 pp.

"ITU-T H.265, Series H: Audiovisual and Multimedia Systems, Infrastructure of audiovisual services—Coding of moving video, High efficiency video coding, The International Telecommunication Union, Oct. 2014, 540 pp."

* cited by examiner

SIGNALING OF LONG-TERM REFERENCE PICTURES FOR VIDEO CODING

This application claims the benefit of U.S. Provisional Application Ser. No. 61/667,371, filed Jul. 2, 2012, the entire contents of which are hereby incorporated by reference.

TECHNICAL FIELD

This disclosure generally relates to processing video data and, more particularly, to techniques for supporting random access in compressed video streams.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, transcoders, routers or other network devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, proprietary standards, open video compression formats such as VP8, and extensions of such standards, techniques or formats. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding data representative of how a reference picture set is to be formed for a current picture. That is, when a current picture is inter-prediction coded, blocks of the current picture are predicted relative to one or more previously coded reference pictures. These reference pictures may be included in a reference picture set. A video coder may construct a reference picture list from the reference picture set. The video coder may code information indicative of which of a set of potential reference pictures is to be included in the reference picture set. This information may correspond to data representative of picture order count (POC) values for the reference pictures to be included in the reference picture set. Rather than coding the full POC values, video coders may be configured to code only least significant bits (LSBs) of the POC values, unless data representative of the MSBs is necessary, e.g., when two reference pictures have the same LSBs. This disclosure describes techniques for using predictive coding to code MSBs for reference pictures.

In one example, a method of decoding video data includes decoding a value representative of a difference between most significant bits (MSBs) of a reference picture order count (POC) value and MSBs of a long-term reference picture (LTRP) POC value, wherein the reference POC value corresponds to a POC value of a current picture or a POC value of a picture, preceding the current picture in decoding order, for which data must have been received in order to properly decode the current picture, determining the MSBs of the LTRP POC value based on the decoded value and the reference POC value, and decoding at least a portion of the current picture relative to the LTRP based at least in part on the LTRP POC value.

In another example, a method of encoding video data includes encoding at least a portion of a current picture relative to a long-term reference picture (LTRP), determining an LTRP picture order count (POC) value for the LTRP, and encoding a value representative of a difference between most significant bits (MSBs) of a reference picture order count (POC) value and MSBs of the LTRP POC value, wherein the reference POC value corresponds to a POC value of a current picture or a POC value of a picture, preceding the current picture in decoding order, for which data must have been received in order to properly decode the current picture.

In another example, a device for decoding video data includes a video decoder configured to decode a value representative of a difference between most significant bits (MSBs) of a reference picture order count (POC) value and MSBs of a long-term reference picture (LTRP) POC value, wherein the reference POC value corresponds to a POC value of a current picture or a POC value of a picture, preceding the current picture in decoding order, for which data must have been received in order to properly decode the current picture, determine the MSBs of the LTRP POC value based on the decoded value and the reference POC value, and decode at least a portion of the current picture relative to the LTRP based at least in part on the LTRP POC value.

In another example, a device for decoding video data includes means for decoding a value representative of a difference between most significant bits (MSBs) of a reference picture order count (POC) value and MSBs of a long-term reference picture (LTRP) POC value, wherein the reference POC value corresponds to a POC value of a current picture or a POC value of a picture, preceding the current picture in decoding order, for which data must have been received in order to properly decode the current picture, means for determining the MSBs of the LTRP POC value based on the decoded value and the reference POC value, and means for decoding at least a portion of the current picture relative to the LTRP based at least in part on the LTRP POC value.

In another example, a computer-readable storage medium has stored thereon instructions that, when executed, cause a processor to decode a value representative of a difference between most significant bits (MSBs) of a reference picture order count (POC) value and MSBs of a long-term reference picture (LTRP) POC value, wherein the reference POC value corresponds to a POC value of a current picture or a POC value of a picture, preceding the current picture in decoding order, for which data must have been received in order to properly decode the current picture, determine the MSBs of the LTRP POC value based on the decoded value and the reference POC value, and decode at least a portion of the current picture relative to the LTRP based at least in part on the LTRP POC value.

The details of one or more examples are set forth in the accompanying drawings and the description below. Other features, objects, and advantages will be apparent from the description and drawings, and from the claims.

DETAILED DESCRIPTION

Figure 1:
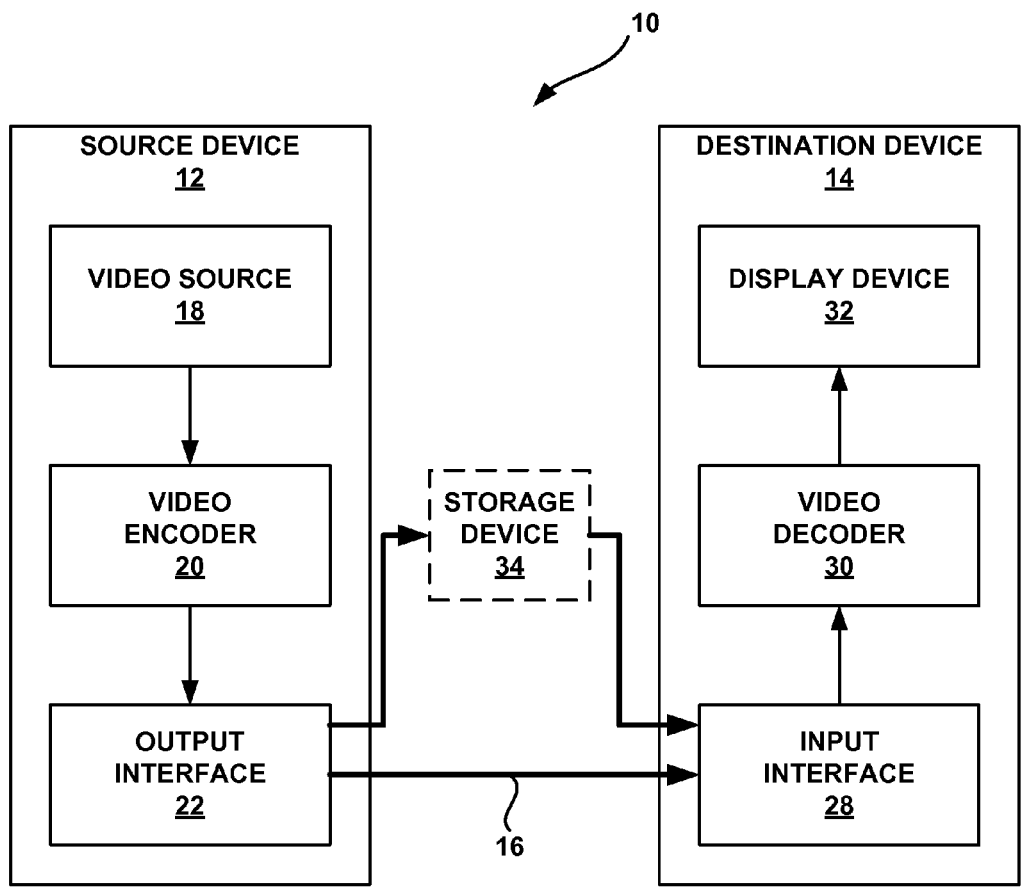
FIG. 1 is a block diagram illustrating an example video encoding and decoding system that may utilize the techniques described in this disclosure.

This disclosure describes various techniques for signaling of long-term reference pictures, as well as improved coding of parameters for random access point pictures, which include instantaneous decoding refresh (IDR) pictures, clean random access (CRA) pictures, and broken link access (BLA) pictures.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD7 hereinafter, is available from http://phenix.int-evey.fr/jct/doc_end_user/documents/9_Geneva/wg11/JCTVC-I1003-v5.zip.

In general, video coding involves coding individual pictures. Each picture may be divided into blocks (e.g., coding units or "CUs" in HEVC), and predictively coded. Prediction may generally be spatial (that is, intra-picture predicted) or temporal (that is, inter-picture predicted). In multi-layer video coding techniques, such as for three-dimensional video coding, blocks of a picture may also be inter-layer or inter-view coded, in a manner substantially similar to inter-picture temporal prediction. The techniques of this disclosure are primarily directed to inter-prediction, e.g., temporal prediction. In temporal inter-prediction, a current picture may be inter-predicted from pictures in one temporal direction (e.g., pictures having display values earlier than the current picture or pictures having display values later than the current picture). Inter-prediction in one temporal direction is typically referred to as uni-directional prediction, performed according to "P-mode" prediction. Inter-prediction in two temporal directions, that is, a block predicted from both a picture having an earlier display order and a picture having a later display order than the current picture, is typically referred to as bi-directional prediction, performed according to "B-mode" prediction.

When performing inter-prediction, a video coder typically constructs one or more reference picture lists. For instance, "List 0" may include reference pictures having a display order earlier than the display order of the current picture, while "List 1" may include reference pictures having a display order later than the display order of the current picture. In this manner, to identify the reference picture for a particular block of the current picture, the video coder may code syntax elements indicative of which list the reference picture is included in, as well as an index into the list. This method of identifying the reference picture may use less bits than identifying the picture directly.

Reference pictures may include two types of reference pictures: long-term reference pictures (LTRPs) and short-term reference pictures (STRPs). LTRPs and their signaling in HEVC will now be described. A reference picture is defined as a picture with nal_ref_flag equal to 1. A reference picture contains samples that may be used for inter prediction in the decoding process of subsequent pictures in decoding order. A long-term reference picture is defined as a reference picture that is marked as "used for long-term reference."

As noted above, a video coder may construct one or more reference picture lists for a current inter-prediction coded picture. The video coder may construct a reference picture list from a reference picture set. The video coder may further code data representative of how to construct the reference picture set, which may include coding data indicating which LTRPs are to be included in the reference picture set. For example, the video coder may code, in a slice header for a slice of the current picture, data representative of which LTRPs are to be included in the reference picture set to code data of the slice. Alternatively, data representative of the LTRPs may be coded in a picture parameter set (PPS), a sequence parameter set (SPS), or other such data structure. That is, the PPS may correspond to the current picture that includes the current slice, while the SPS may correspond to a sequence of pictures including the current picture.

Data representative of LTRPs may include data representative of picture order count (POC) values for the LTRPs. This disclosure describes techniques directed to coding of POC values for LTRPs. POC values generally correspond to a sequence of bits. Therefore, POC values for LTRPs may be coded in two parts: most-significant bits (MSBs) and least-significant bits (LSBs). The MSBs and LSBs of a given POC value, when concatenated, form the full POC value. The MSBs and LSBs may be separately coded. The MSBs of a POC value for an LTRP may be coded when POC values for two or more LTRPs have the same LSBs.

In accordance with the techniques of this disclosure, a video coder, such as a video encoder or a video decoder, may be configured to use predictive coding methods to code the MSBs of a POC value, e.g., for an LTRP. The video coder may determine a reference POC value as the POC value for a picture that must have been received in order to properly decode the current picture. It is assumed that the current picture is inter-prediction coded, because the current picture has reference pictures, such as LTRPs. Thus, a picture that must have been received in order to properly decode the current picture may include a most recent random access point (RAP) picture, other reference pictures for the current picture, or even the current picture itself. The techniques of this disclosure are generally described with respect to the picture that must have been received in order to properly decode the current picture as being either the current picture itself or the most recent RAP picture, although it should be understood that other pictures may be used as well, such as other pictures on which the current picture depends.

In some examples, the video coder may determine a reference POC value for the POC value of a LTRP for a current picture to be either the POC value for the current picture itself or the POC value for the most recent RAP picture (in coding order, e.g., encoding order or decoding order). In either case, the video coder may use the MSBs of the reference POC value as a predictive value for the MSBs of the POC value for the LTRP. Thus, the video coder may code a difference value, representative of the difference between the MSBs of the reference POC value and the MSBs of the POC value for the LTRP (sometimes referred to as the LTRP POC value). A video encoder, for example, may calculate the difference by subtracting the MSBs of the reference POC value from the POC value for the LTRP, then encode the difference. A video decoder, as another example, may decode the difference, then add the difference to the MSBs of the reference POC value to reproduce the MSBs for the LTRP.

Furthermore, a video coder may code a syntax element representing which picture is used to obtain the reference POC value. That is, a video coder may code a value for a syntax element that indicates whether the reference POC for an LTRP corresponds to the current picture or the most recent RAP picture. For instance, a video encoder may determine whether the reference POC should correspond to the POC value for the current picture or to the most recent RAP picture, e.g., based on a determination of which of these two POC values will produce the lowest difference value. As another example, the video decoder may decode the syntax element and use the decoded value for the syntax element to determine whether the reference POC is the POC for the current picture or the POC for the most recent RAP picture.

As discussed above, this disclosure also describes techniques related to coding and processing of RAP pictures. RAP pictures include IDR pictures, CRA pictures, and BLA pictures. Pictures that follow a RAP picture in decoding order but precede the RAP picture in output order (or display order) are referred to as leading pictures associated with the RAP picture (or leading pictures of the RAP picture). For a particular CRA or BLA picture, some of the associated leading pictures are correctly decodable even when the CRA or BLA picture is the first picture in the bitstream. These leading pictures are referred to as decodable leading pictures (DLPs), and other leading pictures are referred to as non-decodable leading pictures (NLPs). NLPs are also referred to as tagged for discard (TFD) pictures in the latest HEVC draft specification.

The signaling of LTRPs in HEVC WD7 is described in this section. A flag in the SPS indicates whether LTRPs are signaled at all for the coded video sequence. In the slice header, the LSB values of picture order count (POC) value of the LTRPs are explicitly signaled. The MSB bits of the POC of the LTRP are signaled if there are more than one reference picture in the DPB that has the same LSB bits as the LTRP. Finally, a flag is used to indicate whether the signaled LTRP may be used by the current picture for reference.

Random access and bitstream splicing is now described. Random access refers to a decoding of a video bitstream starting from a coded picture that is not the first coded picture in the bitstream. Random access to a bitstream is needed in many video applications, such as broadcasting and streaming, e.g., for users to switch between different channels, to jump to specific parts of the video, or to switching to a different bitstream for stream adaptation (of the bit rate, frame rate, spatial resolution, and so on). This feature is enabled by inserting random access pictures or random access points, many times in regular intervals, into the video bitstream.

Bitstream splicing refers to the concatenation of two or more bitstreams or parts thereof. For example, a first bitstream may be appended by a second bitstream, possibly with some modifications to either one or both of the bitstreams to generate a spliced bitstream. The first coded picture in the second bitstream is also referred to as the splicing point. Therefore, pictures since the splicing point in the spliced bitstream were originated from the second bitstream while pictures preceding the splicing point in the spliced bitstream were originated from the first bitstream.

Splicing of bitstreams is performed by bitstream splicers. Bitstream splicers are often lightweight and much less intelligent than encoders. For example, they may not be equipped with entropy decoding and encoding capabilities.

Bitstream switching may be used in adaptive streaming environments. A bitstream switching operation at certain picture in the switch-to bitstream is effectively a bitstream splicing operation wherein the splicing point is the bitstream switching point, i.e., the first picture from the switch-to bitstream.

Random access point (RAP) pictures will now be described. Instantaneous decoding refresh (IDR) pictures as specified in AVC or HEVC can be used for random access. However, since pictures following an IDR picture in decoding order cannot use pictures decoded prior to the IDR picture as reference, bitstreams relying on IDR pictures for random access can have significantly lower coding efficiency.

To improve coding efficiency, the concept of clean random access (CRA) pictures was introduced in HEVC to allow pictures that follow a CRA picture in decoding order but precede it in output order to use pictures decoded before the CRA picture as reference. Pictures that follow a CRA picture in decoding order but precede the CRA picture in output order are referred to as leading pictures associated with the CRA picture (or leading pictures of the CRA picture). The leading pictures of a CRA picture are correctly decodable if the decoding starts from an IDR or CRA picture before the current CRA picture. However, the leading pictures of a CRA picture may be non-correctly-decodable when random access from the CRA picture occurs; hence the leading pictures are typically discarded during random access decoding. To prevent error propagation from reference pictures that may not be available depending on where the decoding starts, all pictures that follow a CRA picture both in decoding order and output order shall not use any picture that precedes the CRA picture either in decoding order or output order (which includes the leading pictures) as reference.

The concept of broken link access (BLA) picture was further introduced in HEVC after the introduction of CRA pictures and based on the concept of CRA pictures. A BLA picture typically originates from bitstream splicing at the position of a CRA picture, and in the spliced bitstream the splicing point CRA picture is changed to a BLA picture.

IDR pictures, CRA pictures, and BLA pictures are collectively referred to as random access point (RAP) pictures. The difference between BLA pictures and CRA pictures is as follows. For a CRA picture, the associated leading pictures are correctly decodable if the decoding starts from a RAP picture before the CRA picture in decoding order, and may be non-correctly-decodable when random access from the CRA picture occurs (i.e., when the decoding starts from the CRA picture, or in other words, when the CRA picture is the first picture in the bitstream). For a BLA picture, the associated leading pictures may be non-correctly-decodable in all cases, even when the decoding starts from a RAP picture before the BLA picture in decoding order.

For a particular CRA or BLA picture, some of the associated leading pictures are correctly decodable even when the CRA or BLA picture is the first picture in the bitstream. These leading pictures are referred to as decodable leading pictures (DLPs), and other leading pictures are referred to as non-decodable leading pictures (NLPs). NLPs are also referred to as tagged for discard (TFD) pictures in the latest HEVC draft specification.

Change of a CRA picture to a BLA picture are now discussed. A BLA picture was also referred to as Broken-Link CRA (BLC) picture, e.g., in co-pending and commonly assigned U.S. Provisional Application No. 61/643,100, filed on May 4, 2012, the entire content of which is incorporated herein by reference. The methods described below were described in U.S. Provisional Application No. 61/643,100 to enable changing of a CRA picture to a BLA or BLC picture in a simpler fashion.

To enable simple rewriting of a CRA to a BLC picture, in addition to put no_output_of_prior_pics_flag to the slice header of a CRA picture, also no_output_of_prior_pics_flag should be included as early as possible in the slice header, preferably not after any entropy coded SH parameters, e.g., immediately after first_slice_in_pic_flag.

A worse case may happen: that two back-to-back BLC pictures have the same POC LSB, and it is only possible to differentiate them by random_access_pic_id (or renamed to rap_pic_id). Thus, it might be preferable to use fixed-length coding for rap_pic_id, and also put included as early as possible in the slice header, preferably not after any entropy coded sliced header parameters, e.g., immediately after first_slice_in_pic_flag and no_output_of_prior_pics_flag, e.g., for both CRA pictures and BLC pictures. Similar for other slice header syntax elements that may be used for picture boundary detection, e.g., pic_parameter_set_id, and POC LSB (i.e., pic_order_cnt_lsb).

A number of problems may exist. For example, existing methods for signaling of LTRPs are either not error resilient (e.g. signaling LTRPs through only POC LSBs) or not efficient (e.g. not possible to signal LTRPs in the sequence parameter set or picture parameter set). Existing methods for changing of a CRA picture to a BLA picture may require the change of the value of no_output_of_prior_pics_flag and waste bits for coding of rap_pic_id. The techniques of this disclosure may be implemented to overcome the problems described above. These techniques are described in greater detail below.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12.

Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). A recent draft of HEVC is available, as of Jul. 2, 2012, from http://wg11.sc29.org/jct/doc_end_user/current-_document.php?id=5885/JCTVC-I1003-v5, the entire content of which is incorporated herein by reference. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263, as well as open formats such as VP8.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock may have a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU may be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, video encoder 20 and video decoder 30 may be configured to perform various techniques relating to coding of MSBs of POC values for LTRPs and to coding of RAP pictures. In one example, a flag, delta_poc_lt_curr_pic_flag[i], is added into, e.g., the slice header, the flag delta_poc_msb_present_flag[i] in the slice header is removed, and the field delta_poc_msb_cycle_lt[i] is present in the slice header when num_long_term_pics is greater than 0. That is, video encoder 20 and video decoder 30 may be configured to code a value for delta_poc_lt_curr_pic_flag[i], rather than for delta_poc_msb_present_flag[i]. In this example, if delta_poc_lt_curr_pic_flag[i] is equal to 1, the difference between the POC values of the current picture and the LTRP to be included in the long-term reference picture set of the current picture is signaled. Otherwise, the difference between the POC values of the previous RAP picture in decoding order and the LTRP to be included in the long-term reference picture set of the current picture is signaled.

In another example, on top of the first example mentioned above, signaling of LTRPs in a sequence parameter set (SPS) is enabled. Alternatively, the signaling of LTRPs can be in the picture parameter set (PPS), in addition to or in the alternative to the SPS.

In another example, the value of no_output_of_prior_pics_flag in slice headers of CRA pictures is mandated to be equal to 1.

In another example, rap_pic_id is coded using a u(N) descriptor, with N being 5, 6, 7, 8, or 9, and placed early in the slice header, before any entropy coded syntax elements. In accordance with HEVC, "U(N)" represents coding of a syntax element using N bits. Thus, rap_pic_id may be coded using 5, 6, 7, 8, or 9 bits, in accordance with the techniques of this disclosure.

Video encoder 20 and video decoder 30 may be configured to code POC values (and, in particular, MSBs of POC values) for LTRPs of a current picture in various ways. Three example techniques (referred to as example implementations 1, 2, and 3) are described below. In general, these example techniques include predicting MSBs of a POC value for an LTRP from MSBs of a POC value for a picture that must have been received in order to properly decode the current picture, such as a most recent random access point (RAP) picture or the current picture itself.

Syntax for example implementation 1 is shown below in Table 1. Video encoder 20 and/or video decoder 30 may be configured to code a slice header in accordance with Table 1 below, based on the semantics defined below Table 1. Syntax, semantics, and decoding process changes described by this disclosure for example implementation 1 are shown relative to HEVC WD7 below, wherein additions are represented by underlined text, and removals are represented by strikethrough text:

TABLE 1

| slice_header( ) { | Descriptor |
|---|---|
| ... | |
| if( long_term_ref_pics_present_flag ) { | |
|   num_long_term_pics | ue(v) |
|   for( i = 0; i < num_long_term_pics; i++ ) { | |
|     poc_lsb_lt [ i ] | u(v) |
|     delta_poc_lt_curr_pic_flag[i] | u(1) |
|     ~~delta_poc_msb_present_flag[ i ]~~ | ~~u(1)~~ |
|     ~~if( delta_poc_msb_present_flag[ i ] )~~ | |
|     delta_poc_msb_cycle_lt[ i ] | ue(v) |
|     used_by_curr_pic_lt_flag[ i ] | u(1) |
|   } | |
| } | |
| ... | |

As shown in Table 1, the syntax element delta_poc_lt_curr_pic_flag[i] is added relative to the slice header syntax of HEVC WD7, while the syntax element delta_poc_msb_present_flag[i] and the conditional statement "if (delta_poc_msb_present_flag[i])" are removed. Semantics for the new syntax element are described below, and semantics for poc_lsb_lt[i] may be changed as discussed below.

poc_lsb_lt[i] specifies the value of the least significant bits of the picture order count value of the i-th long-term reference picture that is included in the long-term reference picture set of the current picture. The length of the poc_lsb_lt[i] syntax element is log 2_max_pic_order_cnt_lsb_minus4+4 bits.

delta_poc_lt_curr_pic_flag[i] (together with delta_poc_msb_cycle_lt[i]) is used to determine the value of the most significant bits of the picture order count value of the i-th long-term reference picture that is included in the long-term reference picture set of the current picture.

delta_poc_msb_cycle_lt[i] (together with delta_poc_lt_curr_pic_flag[i]) is used to determine the value of the most significant bits of the picture order count value of the i-th long-term reference picture that is included in the long-term reference picture set of the current picture.

The variable PocLt[i] is derived as follows, in this example:

<u>deltaPocMSBCycleLt[ i ] = delta_poc_msb_cycle_lt[ i ]
if( i != 0 )
  deltaPocMSBCycleLt[ i ] += deltaPocMSBCycleLt[ i– 1]
if( delta_poc_lt_curr_pic_flag[ i ] )
  PocLt[ i ] = PicOrderCntMsb –
deltaPocMSBCycleLt[ i ] * MaxPicOrderCntLsb + poc_lsb_lt[ i ]
else
  PocLt[ i ] =
PrevRapPicPocMsb + deltaPocMSBCycleLt[ i ] *
MaxPicOrderCntLsb + poc_lsb_lt[ i ]</u>

Wherein PicOrderCntMsb is the difference between the picture order count value of the current picture and pic_order_cnt_lsb of the current picture, and PrevRapPicPocMsb is difference between the PicOrderCntVal value of the previous RAP picture in decoding order and pic_order_cnt_lsb of the previous RAP picture in decoding order.

The value of Abs(PicOrderCntVal−PocLt[i]) shall be in the range of 1 to $2^{24}-1$, inclusive, wherein PicOrderCntVal is the picture order count value of the current picture.

The following is an example decoding process for the reference picture set, in accordance with example implementation 1:

...

If the current picture is a CRA picture that is the first coded picture in the bitstream, an IDR picture or a BLA picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll are all set to 0.

---

```
...
    for( i = 0, j = 0, k = 0; i < num_long_term_pics; i++ )
```
~~if( delta_poc_msb_present_flag[ i ] )~~
~~if( used_by_curr_pic_lt_flag[ i ] )~~
~~PocLtCurr[ j++ ] = PicOrderCntVal - DeltaPocMSBCycleLt[ i ] *~~
~~MaxPicOrderCntLsb -~~
~~pic_order_cnt_lsb + poc_lsb_lt[ i ]~~
~~else~~
~~PocLtFoll[ k++ ] = PicOrderCntVal - DeltaPocMSBCycleLt[ i ] *~~
~~MaxPicOrderCntLsb -~~
~~pic_order_cnt_lsb + poc_lsb_lt[ i ]~~
~~else~~
```
        if( used_by_curr_pic_lt_flag[ i ] )
            PocLtCurr[ j++ ] = PocLt[i]
```
~~poc_lsb_lt[ i ]~~
```
        else
            PocLtFoll[ k++ ] = PocLt[i]
```
~~poc_lsb_lt[ i ]~~
```
NumPocLtCurr = j
NumPocLtFoll = k
...
```

---

1. The following applies:

```
    for( i = 0; i < NumPocLtCurr; i++ ) {
```
~~if( !delta_poc_msb_present_flag[ i ] ) {~~
~~if( there is a long-term reference picture picX in the DPB [Ed. (JB):~~
~~Should be made more precise.]~~
~~        with pic_order_cnt_lsb equal to PocLtCurr[ i ] )~~
~~    RefPicSetLtCurr[ i ] = picX~~
~~            else if( there is a short-term reference picture picY in the DPB~~
~~                with pic_order_cnt_lsb equal to PocLtCurr[ i ] )~~
~~        RefPicSetLtCurr[ i ] = picY~~
~~else~~
~~RefPicSetLtCurr[ i ] = picY~~
~~} else {~~
```
        if( there is a long-term reference picture picX in the DPB
                with PicOrderCntVal equal to PocLtCurr[ i ] )
            RefPicSetLtCurr[ i ] = picX
        else if( there is a short-term reference picture picY in the DPB
                with PicOrderCntVal equal to PocLtCurr[ i ] )
            RefPicSetLtCurr[ i ] = picY
        else
            RefPicSetLtCurr[ i ] = "no reference picture"
```
~~}~~
```
    }
    for( i = 0; i < NumPocLtFoll; i++ ) {
```
~~if( !delta_poc_msb_present_flag[ i ] ) {~~
~~if( there is a long-term reference picture picX in the DPB~~
~~with pic_order_cnt_lsb equal to PocLtFoll[ i ] )~~
~~RefPicSetLtFoll[ i ] = picX~~
~~else if( there is a short-term reference picture picY in the DPB~~
~~with pic_order_cnt_lsb equal to PocLtFoll[ i ] )~~
~~RefPicSetLtFoll[ i ] = picY~~
~~else~~
~~RefPicSetLtFoll[ i ] = "no reference picture"~~
~~} else {~~
```
        if( there is a long-term reference picture picX in the DPB
                    with PicOrderCntVal to PocLtFoll[ i ] )
            RefPicSetLtFoll[ i ] = picX
        else if( there is a short-term reference picture picY in the DPB
                    with PicOrderCntVal equal to PocLtFoll[ i ] )
            RefPicSetLtFoll[ i ] = picY
        else
            RefPicSetLtFoll[ i ] = "no reference picture"
```
~~}~~
```
    }
```

---

2. All reference pictures included in RefPicSetLtCurr and RefPicSetLtFoll are marked as "used for long-term reference"

3. The following applies:

```
    for( i = 0; i < NumPocStCurrBefore; i++ )
        if( there is a short-term-reference picture picX in the DPB
                with PicOrderCntVal equal to PocStCurrBefore[ i ])
            RefPicSetStCurrBefore[ i ] = picX
        else
            RefPicSetStCurrBefore[ i ] = "no reference picture"
    for( i = 0; i < NumPocStCurrAfter; i++ )
        if( there is a short-term reference picture picX in the DPB
                with PicOrderCntVal equal to PocStCurrAfter[ i ])
            RefPicSetStCurrAfter[ i ] = picX
        else
            RefPicSetStCurrAfter[ i ] = "no reference picture"                    (8-7)
    for( i = 0; i < NumPocStFoll; i++ )
        if( there is a short-term reference picture picX in the DPB
                with PicOrderCntVal equal to PocStFoll[ i ])
            RefPicSetStFoll[ i ] = picX
    else
            RefPicSetStFoll[ i ] = "no reference picture"
```

---

4. All reference pictures included in RefPicSetStCurrBefore, RefPicSetStCurrAfter and RefPicSetStFoll are marked as "used for short-term reference".

5. All reference pictures in the decoded picture buffer that are not included in RefPicSetLtCurr, RefPicSetLtFoll, RefPicSetStCurrBefore, RefPicSetStCurrAfter or RefPicSetStFoll are marked as "unused for reference".

Example implementation 2 is described below. Video encoder 20 and/or video decoder 30 may be configured to code a sequence parameter set in accordance with Table 2 below, and a slice header in accordance with Table 3 below, based on the semantics defined below Table 2 and Table 3, respectively.

Syntax, semantics and decoding process changes in relative to HEVC WD7 are provided below, wherein additions are represented using underlined text, and removals are represented using strikethrough text. Additions and changes relative to example implementation 1 above are represented using double underlined text.

Syntax and semantics for example implementation 2 are shown in Tables 2 and 3 below:

TABLE 2

| seq_parameter_set_rbsp( ) { | Descriptor |
|---|---|
| ... | |
| num_short_term_ref_pic_sets | ue(v) |
| for( i = 0; i < num_short_term_ref_pic_sets; i++) | |
| short_term_ref_pic_set( i ) | |
| long_term_ref_pics_present_flag | u(1) |
| if(long_term_ref_pics_present_flag) { | |
| num_long_term_ref_pics_sps | ue(v) |
| for( i = 0; i < num_long_term_ref_pics_sps; i++ ) | |
| lt_ref_pic_poc_lsb_sps[i] | u(v) |
| } | |
| ... | |
| } | | num_long_term_ref_pics_sps specifies the number of long-term reference pictures that are specified in the sequence parameter set. The value of num_long_term_ref_pics_sps shall be in the range of 0 to 32, inclusive.

lt_ref_pic_poc_lsb_sps[i] specifies the least significant bits of the picture order count of the i-th long-term reference picture specified in the sequence parameter set. The number of bits used to represent lt_ref_pic_poc_lsb_sps[i] shall be equal to log 2_max_pic_order_cnt_lsb_minus4+4.

TABLE 3

| slice_header( ) { | Descriptor |
|---|---|
| ... | |
| if( long_term_ref_pics_present_flag ) { | |
| num_long_term_pics | ue(v) |
| if(num_long_term_ref_pics_sps) | |
| num_long_term_sps | ue(v) |
| for( i = 0; i < num_long_term_sps + num_long_term_pics;i++){ | |
| if(i<num_long_term_sps) | |
| lt_idx_sps[i] | u(v) |
| else | |
| poc_lsb_lt[ i ] | u(v) |
| delta_poc_lt_curr_pic_flag[i] | u(1) |
| delta_poc_msb_present_flag[i] | u(1) |
| if( delta_poc_msb_present_flag[i] ) | |
| delta_poc_msb_cycle_lt[ i ] | ue(v) |
| used_by_curr_pic_lt_flag[ i ] | u(1) |
| } | |
| } | |
| ... | |

As shown in Table 3, the syntax elements delta_poc_lt_curr_pic_flag[i], num_long_term_sps, and lt_idx_sps[i] are added relative to the slice header syntax of HEVC WD7, while the syntax element delta_poc_msb_present_flag[i] and the conditional statement "if(delta_poc_msb_present_flag[i])" are removed. In addition, new conditional statements with respect to the number of long-term reference pictures are added. Semantics for the new syntax elements are described below, and semantics for poc_lsb_lt[i] may be changed as discussed below.

num_long_term_pics specifies the number of the long-term reference pictures that are to be included in the long-term reference picture set of the current picture and that are directly signalled in the slice header. The value of num_long_term_pics shall be in the range of 0 to sps_max_dec_pic_buffering[sps_max_temporal_layers_minus1]−NumNegativePics[StRpsIdx]−NumPositivePics[StRpsIdx]−num_long_term_sps, inclusive. When not present, the value of num_long_term_pics is inferred to be equal to 0.

num_long_term_sps specifies the number of long-term reference pictures that are specified in the active sequence parameter set and that are to be included in the long-term reference picture set of the current picture. If num_long_term_sps is not present, the value is inferred to be equal to 0. The value of num_long_term_sps shall be in the range of 0 to Min(num_long_term_ref_pics_sps, max_dec_pic_buffering[max_temporal_layers_minus1]−NumNegativePics[StRpsIdx]−NumPositivePics[StRpsIdx]−num_long_term_pics), inclusive.

lt_idx_sps[i] specifies the index, to the list of long-term reference pictures specified in the active sequence parameter set, of the i-th long-term reference picture inherited from the referred sequence parameter set to the long-term reference picture set of the current picture. The value of lt_idx_sps[i] shall be in the range of 0 to num_long_term_ref_pics_sps−1, inclusive.

poc_lsb_[i] specifies the value of the least significant bits of the picture order count value of the i-th long-term reference picture that is included in the long-term reference picture set of the current picture. The length of the poc_lsb_lt[i] syntax element is log 2_max_pic_order_cnt_lsb_minus4+4 bits.

The variable PocLsbLt[i] is derived as follows.

```
if( i < num_long_term_sps )
    PocLsbLt[ i ] = lt_ref_pic_poc_lsb_sps[ lt_idx_sps[ i ] ]
else
    PocLsbLt[ i ] = poc_lsb_lt[ i ]
``` delta_poc_lt_curr_pic_flag[i] (together with delta_poc_msb_cycle_lt[i]) is used to determine the value of the most significant bits of the picture order count value of the i-th long-term reference picture that is included in the long-term reference picture set of the current picture.

delta_poc_msb_cycle_lt[i] (together with delta_poc_lt_curr_pic_flag[i])is used to determine the value of the most significant bits of the picture order count value of the i-th long-term reference picture that is included in the long-term reference picture set of the current picture.

The variable PocLt[i] is derived as follows, in this example:

```
deltaPocMSBCycleLt[ i ] = delta_poc_msb_cycle_lt[ i ]
if( i != 0 || i != num_long_term_sps )
    deltaPocMSBCycleLt[ i ] += deltaPocMSBCycleLt[ i − 1 ]
if( delta_poc_lt_curr_pic_flag[ i ] )
    PocLt[ i ] = PicOrderCntMsb −
```

-continued deltaPocMSBCycleLt[ i ] * MaxPicOrderCntLsb + PocLsbLt[ i ]
    else
        PocLt[ i ] =
PrevRapPicPocMsb + deltaPocMSBCycleLt[ i ] *
MaxPicOrderCntLsb + PocLsbLt[ i ]

Wherein PicOrderCntMsb is the difference between the picture order count value of the current picture and pic_order_cnt_lsb of the current picture, and PrevRapPicPocMsb is difference between the PicOrderCntVal value of the previous RAP picture in decoding order and pic_order_cnt_lsb of the previous RAP picture in decoding order.

The value of Abs(PicOrderCntVal−PocLt[i]) shall be in the range of 1 to $2^{24}-1$, inclusive, wherein PicOrderCntVal is the picture order count value of the current picture.

The decoding process for reference picture set may conform to the following pseudocode and discussion thereof

```
...
[1]for( i = 0, j = 0, k = 0; i < num_long_term_pics+ num_long_term_pics; i++ )
        if( delta_poc_msb_present_flag[ i ] )
        if( used_by_curr_pic_lt_flag[ i ] )
            PocLtCurr[ j++ ] = PicOrderCntVal − DeltaPocMSBCycleLt[ i ] *
MaxPicOrderCntLsb −
                                pic_order_cnt_lsb + poc_lsb_lt[ i ]
        else
            PocLtFoll[ k++ ] = PicOrderCntVal − DeltaPocMSBCycleLt[ i ] *
MaxPicOrderCntLsb −
                                pic_order_cnt_lsb + poc_lsb_lt[ i ]
        else
    if( used_by_curr_pic_lt_flag[ i ] )
        PocLtCurr[ j++ ] = PocLt[i]  poc_lsb_lt[ i ]
    else
        PocLtFoll[ k++ ] = PocLt[i]  poc_lsb_lt[ i ]
NumPocLtCurr = j
NumPocLtFoll = k
...
```

Example implementation 3 is described below. Video encoder 20 and/or video decoder 30 may be configured to code a sequence parameter set in accordance with Table 4, and a slice header in accordance with Table 5 below, based on the semantics defined below Table 4 and Table 5.

Syntax, semantics and decoding process changes in relative to HEVC WD7 are provided below, wherein additions are represented by underlined text, and removals are represented by strikethrough text.

Syntax and semantics for example implementation 3 are shown in Tables 4 and 5 below:

TABLE 4

| seq_parameter_set_rbsp( ) { | Descriptor |
|---|---|
| ... | |
| num_short_term_ref_pic_sets | ue(v) |
| for( i = 0; i < num_short_term_ref_pic_sets; i++) | |
| short_term_ref_pic_set( i ) | |
| long_term_ref_pics_present_flag | u(1) |
| if(long_term_ref_pics_present_flag) { | |
| num_long_term_ref_pics_sps | ue(v) |
| for(i = 0; i < num_long_term_ref_pics_sps; i++ ) { | |
| sps_lt_poc_delta_flag[i] | u(1) |
| sps_lt_poc_len[i] | ue(v) |
| sps_lt_poc_bits[i] | u(v) |
| } | |

TABLE 4-continued

| seq_parameter_set_rbsp( ) { | Descriptor |
|---|---|
| } | |
| ... | |
| } | |

The semantics for the new syntax elements defined in Table 4 are described below, for this example.

num_long_term_ref_pics_sps specifies the number of long-term reference pictures that are specified in the sequence parameter set. The value of num_long_term_ref_pics_sps shall be in the range of 0 to 32, inclusive.

sps_lt_poc_delta_flag[i] equal to 1 specifies that sps_lt_poc_bits[i] represents the difference between the picture order count value of the i-th long-term reference picture specified in the sequence parameter set and the picture order count value of a RAP picture. sps_lt_poc_delta_flag[i] equal to 0 specifies that sps_lt_poc_bits[i] represents the least significant bits of the picture order count value of the i-th long-term reference pictures specified in the sequence parameter set.

sps_lt_Poc_len[i] plus log 2_maxpic_order_cnt_lsb_minus4 plus 4 specifies the number of bits used to represent sps_lt_poc_bits[i].

The variable MaxPicOrderCntLsb2 is derived as follows, in this example:

MaxPicOrderCntLsb2=
    $2^{(sps\_lt\_poc\_len[i]+log\ 2\_max\_pic\_order\_cnt\_lsb\_minus4+4)}$ sps_lt_poc_bits[i] (together with other syntax elements) is used to determine the picture order count of the i-th long-term reference picture specified in the sequence parameter set. The number of bits used to represent sps_lt_poc_bits[i] shall be equal to sps_lt_poc_len[i]+log 2_max_pic_order_cnt_lsb_minus4+4.

TABLE 5

| slice_header( ) { | Descriptor |
|---|---|
| ... | |
| if( long_term_ref_pics_present_flag ) { | |
| num_long_term_pics | ue(v) |
| if(num_long_term_ref_pics_sps) | |
| num_long_term_sps | ue(v) |

TABLE 5-continued

| slice_header( ) { | Descriptor |
|---|---|
| for(i = 0; i < num_long_term_sps + num_long_term_pics;i++){ | |
| if ( i < num_long_term_sps ) { | |
| lt_idx_sps[i] | ue(v) |
| moreLtDataFlag = !sps_lt_poc_delta_flag[lt_idx_sps[ i ]] | |
| } else { | |
| delta_poc_lt_curr_pic_flag[ i ] | u(1) |
| moreLtDataFlag = 1 | |
| } | |
| if( moreLtDataFlag ) { | |
| delta_poc_lt_len[ i ] | ue(v) |
| if( delta_poc_lt_len[ i ] != 0 ) | |
| delta_poc_lt_bits[ i ] | u(v) |
| } | |
| used_by_curr_pic_lt_flag[ i ] | u(1) |
| } | |
| } | |
| ... | |
| ... | |
| } | |

Semantics for the new syntax elements of Table 5 are described below, for this example.

num_long_term_pics specifies the number of the long-term reference pictures that are to be included in the long-term reference picture set of the current picture and that are directly signalled in the slice header. The value of num_long_term_pics shall be in the range of 0 to sps_max_dec_pic_buffering[sps_max_temporal_layers_minus1]−NumNegativePics[StRpsIdx]−NumPositivePics[StRpsIdx]−num_long_term_sps, inclusive. When not present, the value of num_long_term_pics is inferred to be equal to 0.

num_long_term_sps specifies the number of long-term reference pictures that are specified in the active sequence parameter set and that are to be included in the long-term reference picture set of the current picture. If num_long_term_sps is not present, the value is inferred to be equal to 0. The value of num_long_term_sps shall be in the range of 0 to Min(num_long_term refpics_sps, max_dec_pic_buffering[max_temporal_layers_minus1]−NumNegativePics[StRpsIdx]−NumPositivePics[StRpsIdx]−num_long_term_pics), inclusive.

lt_idx_sps[i] specifies the index, to the list of long-term reference pictures specified in the active sequence parameter set, of the i-th long-term reference picture inherited from the referred sequence parameter set to the long-term reference picture set of the current picture. The value of lt_idx_sps[i] shall be in the range of 0 to num_long_term_ref_pics_sps−1, inclusive.

delta_poc_lt_curr_pic_flag[i] equal to 0 specifies that delta_poc_lt_bits[i] represents the difference between the picture order count value of the i-th long-term reference picture to be included in the long-term reference picture set of the current picture and the picture order count value of the previous RAP picture in decoding order. delta_poc_lt_curr_pic_flag[i] equal to 1 specifies that delta_poc_lt_bits[i] represents the difference between the picture order count value of the current picture and the picture order count value of the i-th long-term reference picture to be included in the long-term reference picture set of the current picture.

delta_poc_lt_len[i] specifies the number of bits used to represent delta_poc_lt_bits[i].

delta_poc_lt_bits[i] (together with other syntax elements) is used to determine the picture order count of the i-th long-term reference picture to be included in the long-term reference picture set of the current picture. The number of bits used to represent delta_poc_lt_bits[i] shall be equal to delta_poc_lt_len[i]. When not present, the value of delta_poc_lt_bits[i] is inferred to be equal to 0.

The variable PocLt[i] is derived as follows, in this example.

```
if( i < num_long_term_sps )
    if( sps_lt_poc_delta_flag[ lt_idx_sps[ i ] ] )
        PocLt[ i ] = PrevRapPicPoc +
            sps_lt_poc_bits[ lt_idx_sps[ i ] ]
    else
        PocLt[ i ] = PicOrderCntMsb −delta_poc_lt_bits[ i ] *
            MaxPicOrderCntLsb2 +
            sps_lt_poc_bits[ lt_idx_sps[ i ] ]
else
    if( !delta_poc_lt_curr_pic_flag[ i ] )
        PocLt[ i ] = PrevRapPicPoc + delta_poc_lt_bits[ i ]
    else
        PocLt[ i ] = PicOrderCntVal − delta_poc_lt_bits[ i ]
```

Wherein PicOderCntVal is the picture order count value of the current picture, PrevRapPicPoc is the picture order count value of the previous RAP picture in decoding order, and PicOrderCntMsb is the difference between PicOrderCntVal and pic_order_cnt_lsb of the current picture.

The value of Abs(PicOrderCntVal−PocLt[i]) shall be in the range of 1 to $2^{24}-1$, inclusive.

Alternatively, the syntax element delta_poc_lt_bits[i] may be coded as delta_poc_lt_bits_minus1[i].

Alternatively, the syntax element delta_poc_lt_len[i] is not signaled and delta_poc_lt_bits[i] is coded as ue(v).

Alternatively, moreLtDataFlag may be set to be one even for all the long-term reference pictures inherited from the active sequence parameter set. The derivation of the variable PocLt[i], in this case, would be as follows.

The variable PocLt[i] is derived as follows.

```
if( i < num_long_term_sps )
    if( sps_lt_poc_delta_flag[ lt_idx_sps[ i ] ] )
        PocLt[ i ] = PrevRapPicPoc +
            delta_poc_lt_bits[ i ] *
            MaxPicOrderCntLsb2 + sps_lt_poc_bits[ lt_idx_sps[ i ] ]
    else
        PocLt[ i ] = PicOrderCntMsb −
            delta_poc_lt_bits[ i ] * MaxPicOrderCntLsb2 +
            sps_lt_poc_bits[ lt_idx_sps[ i ] ]
    else
        if( !delta_poc_lt_curr_pic_flag[ i ] )
            PocLt[ i ] = PrevRapPicPoc + delta_poc_lt_bits[ i ]
        else
            PocLt[ i ] = PicOrderCntVal − delta_poc_lt_bits[ i ]
```

The decoding process for the reference picture set, in accordance with example implementation 3, may be the same as the decoding process in example implementation 2, as described above.

In accordance with certain techniques of this disclosure, a video coder (e.g., video encoder 20 and/or video decoder 30) may change a CRA picture to a BLA picture, as described below. Additionally or alternatively, an intermediate device, such as a transcoding device, a media aware network element (MANE), or other such device may be configured to convert a CRA picture to a BLA picture.

The flag no_output_of_prior_pics_flag may be included in the slice header and may be before any entropy coded syntax elements. However, in the entire decoding process (including output and removal of decoded pictures from the DPB), the no_output_of_prior_pics_flag in the slice headers of IDR pictures and BLA pictures is used, while the no_output_of_prior_pics_flag in the slice headers of CRA pictures is not used. Therefore, a better solution is to mandate that the value of no_output_of_prior_pics_flag to be equal to 1 for CRA pictures. This way, when changing a CRA picture to be a BLA picture, the value of no_output_of_prior_pics_flag may be left untouched as equal to 1. Consequently, the flag may be included anyway in the slice header.

The syntax element rap_pic_id may be included in the slice header and may be before any entropy coded syntax elements and may be fixed-length coded. Currently, the value range of rap_pic_id is 0 to 65535, inclusive. Therefore, with the same value range and using fixed-length coding, rap_pic_id would be coded as u(16), using 16 bits. However, always using 16 bits can be a considerable overhead in the slice header. Since the purpose of rap_pid_id is only for picture boundary detection for back-to-back CRA RAP pictures with the same value of NAL unit type (i.e., back-to-back CRA pictures, back-to-back BLA pictures, or back-to-back IDR pictures), a value range smaller than is 0 to 65535, inclusive, e.g. is 0 to 255, inclusive, should also work well. Thus, a better solution would be to use u(N), with N being 5, 6, 7, 8, or 9 for coding of rap_pic_id and to place it early in the slice header, before any entropy coded syntax elements.

Although separate implementations have been described above, it should be understood that, in general, any of the techniques of implementations 1, 2, and 3 may be combined in any combination. Thus, video coding devices, such as video encoder 20 and video decoder 30, may be configured to perform the techniques of one of implementations 1, 2, or 3 alone, or a combination including techniques from implementations 1 and 2, 1 and 3, 2 and 3, or 1, 2, and 3.

In this manner, video encoder 20 and video decoder 30 may be configured to code a value representative of a difference between most significant bits (MSBs) of a reference picture order count (POC) value and MSBs of a long-term reference picture (LTRP) POC value, wherein the reference POC value corresponds to a picture for which data must have been received in order to properly decode a current picture. In particular, in the examples of Tables 1, 3, and 5, the syntax element delta_poc_msb_cycle_lt[i] corresponds to data representative of such a difference value. The syntax element delta_poc_lt_curr_pic_flag[i] in Tables 1, 3, and 5 represents an example of a syntax element that is indicative of whether the MSBs of the LTRP POC value are predicted from a POC value for a random access point (RAP) picture or a POC value for the current picture. Accordingly, video encoder 20 may encode the MSBs of the POC value for an LTRP relative to either the MSBs of the POC value for the most recent RAP picture or the MSBs of the POC value for the current picture, and signal which of these pictures is used by coding a value for delta_poc_lt_curr_pic_flag[i].

Likewise, video decoder 30 may decode the MSBs of the POC value for an LTRP relative to either the MSBs of the POC value for the most recent RAP picture or the MSBs of the POC value for the current picture, as indicated by delta_poc_lt_curr_pic_flag[i]. In particular, when delta_poc_lt_curr_pic_flag[i] indicates that the POC value for the $i^{th}$ LTRP is predicted from the POC value of the current picture, video decoder 30 may add the MSBs POC difference value to the POC value of the current picture to reproduce the MSBs of the POC value for the LTRP. On the other hand, when delta_poc_lt_curr_pic_flag[i] indicates that the POC value for the $i^{th}$ LTRP is predicted from the POC value of the RAP picture, video decoder 30 may add the MSBs POC difference value to the POC value of the RAP picture to reproduce the MSBs of the POC value for the LTRP. In examples where a value for delta_poc_lt_curr_pic_flag[i] is not present (e.g., in the slice header), video decoder 30 may infer that the current picture has no LTRPs.

Furthermore, after decoding the POC values for each LTRP of a current picture (any or all of which may include coded MSB values), video decoder 30 may construct a reference picture set including the LTRPs indicated by the decoded POC values. Video decoder 30 may then generate a reference picture list from the reference picture set, and use the reference picture list to decode blocks of the current picture, or the current slice of the current picture.

Figure 2:
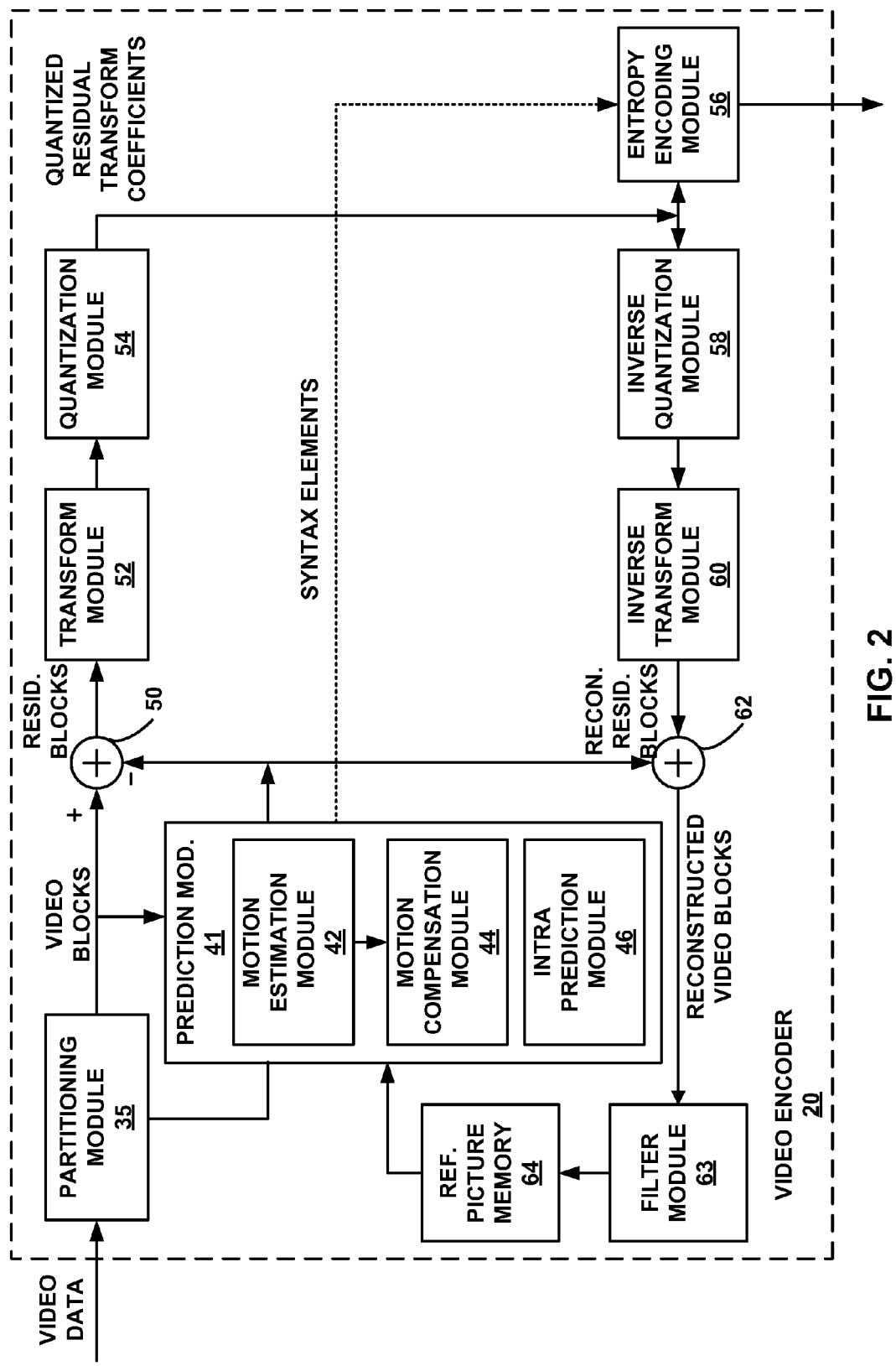
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning module 35, prediction module 41, filter module 63, reference picture memory 64, summer 50, transform module 52, quantization module 54, and entropy encoding module 56. Prediction module 41 includes motion estimation module 42, motion compensation module 44, and intra prediction module 46. For video block reconstruction, video encoder 20 also includes inverse quantization module 58, inverse transform module 60, and summer 62. Filter module 63 is intended to represent one or more loop filters such as a deblocking filter, an adaptive loop filter (ALF), and a sample adaptive offset (SAO) filter. Although filter module 63 is shown in FIG. 2 as being an in loop filter, in other configurations, filter module 63 may be implemented as a post loop filter.

As shown in FIG. 2, video encoder 20 receives video data, and partitioning module 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra—or inter—coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation module 42 and motion compensation module 44 within prediction module 41 perform inter-predictive coding of the current video block relative to one or more predictive blocks in one or more reference pictures to provide temporal compression.

Motion estimation module 42 may be configured to determine the inter-prediction mode for a video slice according to a predetermined pattern for a video sequence. The predetermined pattern may designate video slices in the sequence as P slices, B slices or GPB slices. Motion estimation module 42 and motion compensation module 44 may be highly integrated, but are illustrated separately for conceptual purposes. Motion estimation, performed by motion estimation module 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation module 42 may perform a motion search relative to the full pixel positions and fractional pixel positions and output a motion vector with fractional pixel precision.

Motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation module 42 sends the calculated motion vector to entropy encoding module 56 and motion compensation module 44.

Motion compensation, performed by motion compensation module 44, may involve fetching or generating the predictive block based on the motion vector determined by motion estimation, possibly performing interpolations to sub-pixel precision. Upon receiving the motion vector for the PU of the current video block, motion compensation module 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation module 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation module 42 and motion compensation module 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select module 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

In any case, after selecting an intra-prediction mode for a block, intra-prediction module 46 may provide information indicative of the selected intra-prediction mode for the block to entropy coding module 56. Entropy coding module 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization module 54. Quantization module 54 quantizes the transform coefficients to further reduce bit rate. The quantization process may reduce the bit depth associated with some or all of the coefficients. The degree of quantization may be modified by adjusting a quantization parameter. In some examples, quantization module 54 may then perform a scan of the matrix including the quantized transform coefficients. Alternatively, entropy encoding module 56 may perform the scan.

Following quantization, entropy encoding module 56 entropy encodes the quantized transform coefficients. For example, entropy encoding module 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding module 56, the encoded bitstream may be transmitted to video decoder 30, or archived for later transmission or retrieval by video decoder 30. Entropy encoding module 56 may also entropy encode the motion vectors and the other syntax elements for the current video slice being coded.

Inverse quantization module 58 and inverse transform module 60 apply inverse quantization and inverse transformation, respectively, to reconstruct the residual block in the pixel domain for later use as a reference block of a reference picture. Motion compensation module 44 may calculate a reference block by adding the residual block to a predictive block of one of the reference pictures within one of the reference picture lists. Motion compensation module 44 may also apply one or more interpolation filters to the reconstructed residual block to calculate sub-integer pixel values for use in motion estimation. Summer 62 adds the reconstructed residual block to the motion compensated prediction block produced by motion compensation module 44 to produce a reference block for storage in reference picture memory 64. The reference block may be used by motion estimation module 42 and motion compensation module 44 as a reference block to inter-predict a block in a subsequent video frame or picture.

Video encoder 20 of FIG. 2 represents an example of a video encoder configured to encode at least a portion of a current picture relative to a long-term reference picture (LTRP), determine an LTRP picture order count (POC) value for the LTRP, and encoding a value representative of a difference between most significant bits (MSBs) of a reference POC value and MSBs of the LTRP POC value, wherein the reference POC value corresponds to a picture for which data must be received in order to properly decode the current picture.

In particular, video encoder 20 may construct a reference picture set for a current picture. Video encoder 20 may also determine which of the pictures in the reference picture set are LTRPs. Video encoder 20 may code a value representative of the number of LTRPs in the reference picture set, e.g., a value for num_long_term_pics in Tables 1, 3, and 5, as discussed above with respect to FIG. 1. Video encoder 20 may further encode POC values for each of the LTRPs in the reference picture set. In accordance with the techniques of this disclosure, video encoder 20 may use reference coding techniques when coding most-significant bits (MSBs) of the POC values for the LTRPs.

For example, video encoder 20 may determine a reference POC value as a POC value for a picture that must have been received in order to properly decode the current picture. The picture that must have been received in order to properly decode the current picture may correspond to, for example, the current picture itself or a most recent random access point (RAP) picture, in encoding order. Video encoder 20 may signal whether the reference POC corresponds to the POC value for the current picture or the most recent RAP picture by coding a value for, e.g., delta_poc_lt_curr_pic_flag[i] of Tables 1, 3, and 5. Video encoder 20 may then encode a difference value representing the difference between the MSBs for the LTRP POC value and the MSBs of the reference POC value. This difference value may correspond to delta_poc_msb_cycle_lt[i] of Tables 1, 3, and 5.

Figure 3:
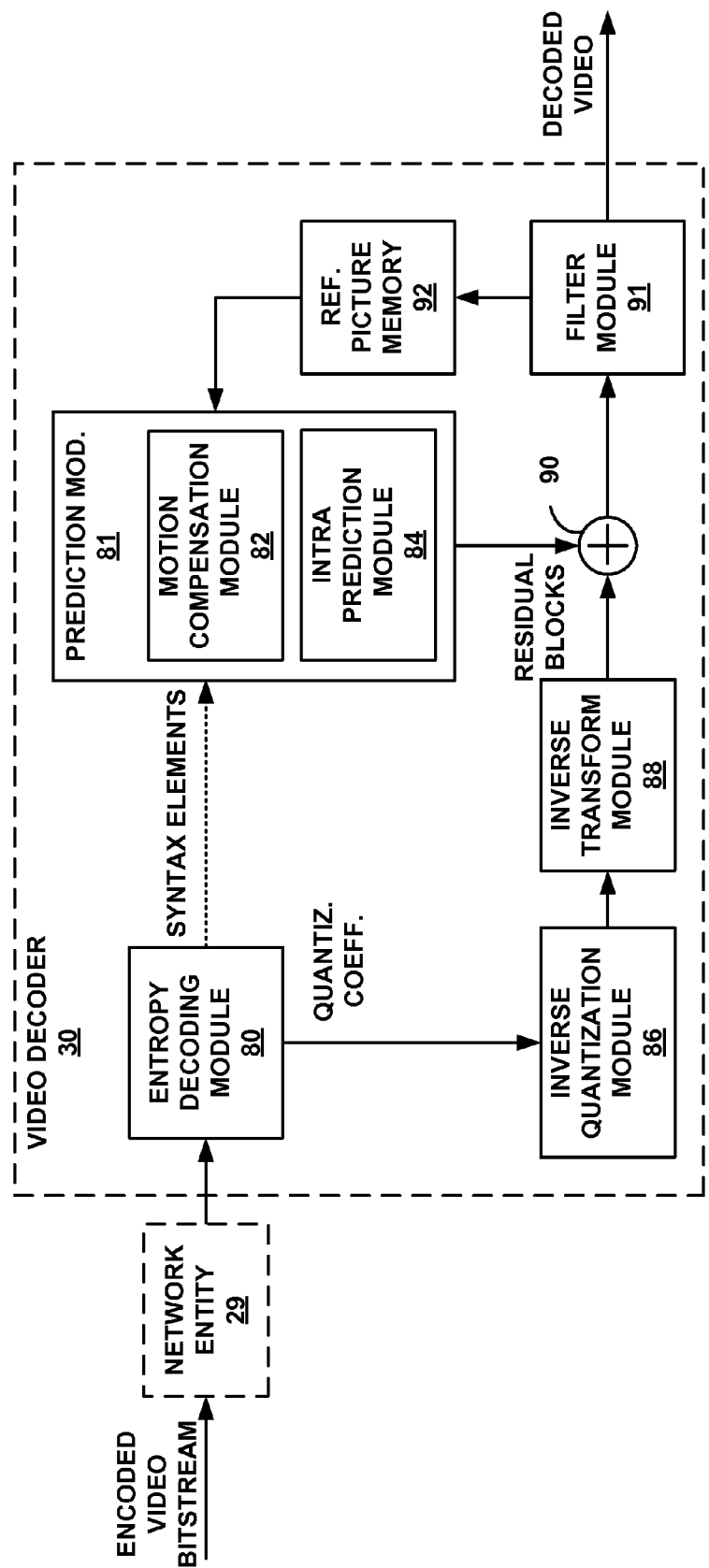
FIG. 3 is a block diagram illustrating an example video decoder that may implement the techniques described in this disclosure.

FIG. 3 is a block diagram illustrating an example video decoder 30 that may implement the techniques of this disclosure.

In the example of FIG. 3, video decoder 30 includes an entropy decoding module 80, prediction module 81, inverse quantization module 86, inverse transformation module 88, summer 90, filter module 91, and reference picture memory 92. Prediction module 81 includes motion compensation module 82 and intra prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a media-aware network element (MANE), a video editor/splicer, or other such device configured to implement one or more of the techniques described above. As described above, some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Entropy decoding module 80 of video decoder 30 entropy decodes the bitstream to generate quantized coefficients, motion vectors, and other syntax elements. Entropy decoding module 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation module 82 of prediction module 81 produces predictive blocks for a video block of the current video slice based on the motion vectors and other syntax elements received from entropy decoding module 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation module 82 determines prediction information for a video block of the current video slice by parsing the motion vectors and other syntax elements, and uses the prediction information to produce the predictive blocks for the current video block being decoded. For example, motion compensation module 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation module 82 may also perform interpolation based on interpolation filters. Motion compensation module 82 may use interpolation filters as used by video encoder 20 during encoding of the video blocks to calculate interpolated values for sub-integer pixels of reference blocks. In this case, motion compensation module 82 may determine the interpolation filters used by video encoder 20 from the received syntax elements and use the interpolation filters to produce predictive blocks.

Inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation module 82 generates the predictive block for the current video block based on the motion vectors and other syntax elements, video decoder 30 forms a decoded video block by summing the residual blocks from inverse transform module 88 with the corresponding predictive blocks generated by motion compensation module 82. Summer 90 represents the component or components that perform this summation operation. If desired, loop filters (either in the coding loop or after the coding loop) may also be used to smooth pixel transitions, or otherwise improve the video quality. Filter module 91 is intended to represent one or more loop filters such as a deblocking filter, an adaptive loop filter (ALF), and a sample adaptive offset (SAO) filter. Although filter module 91 is shown in FIG. 3 as being an in loop filter, in other configurations, filter module 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Video decoder 30 represents an example of a video decoder configured to decode a value representative of a difference between most significant bits (MSBs) of a reference picture order count (POC) value and MSBs of a long-term reference picture (LTRP) POC value, wherein the reference POC value corresponds to a picture for which data must have been received in order to properly decode a current picture, determine the MSBs of the LTRP POC value based on the decoded value and the reference POC value, and decode at least a portion of the current picture relative to the LTRP based at least in part on the LTRP POC value.

In particular, video decoder 30 may decode a difference value representative of a difference between the MSBs of a POC value for an LTRP to be included in a reference picture list, and the MSBs of a reference POC value. The reference POC value may correspond to the picture for which data must have been received in order to properly decode the current picture, e.g., the current picture itself or a most recent RAP picture. Video decoder 30 may decode delta_poc_lt_curr_pic_flag[i] in accordance with Tables 1, 3, and 5 as discussed above, which may indicate whether the picture for which data must have been received in order to properly decode the current picture is the current picture itself or the most recent RAP picture. That is, the delta_poc_lt_curr_pic_flag[i] value may indicate whether the MSBs of the POC value for the $i^{th}$ LTRP are predicted from the POC value of the current picture or the POC value of the most recent RAP picture. Thus, video decoder 30 may decode the difference value and add the difference value to the MSBs of the reference POC value. Video decoder 30 may further reconstruct the POC value for the LTRP by concatenating the MSBs with decoded LSBs of the POC value. Video decoder 30 may also add this reconstructed POC value to the reference picture set.

Figure 4:
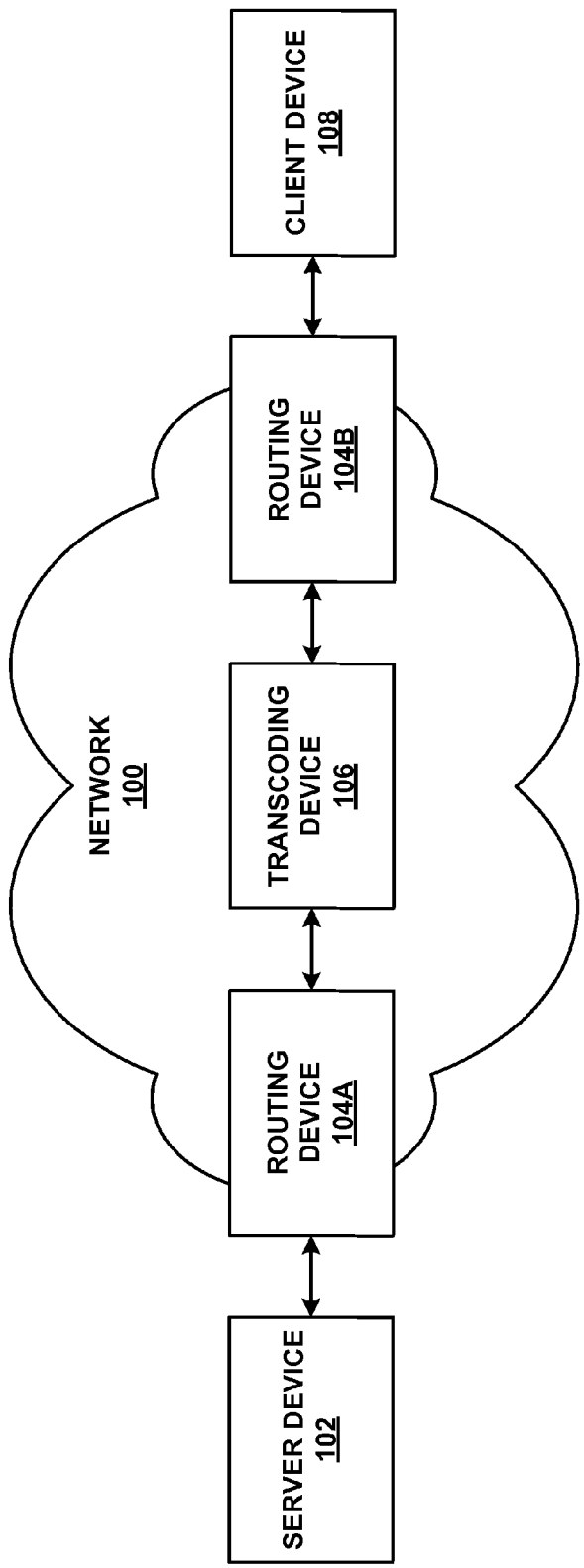
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

Figure 5:
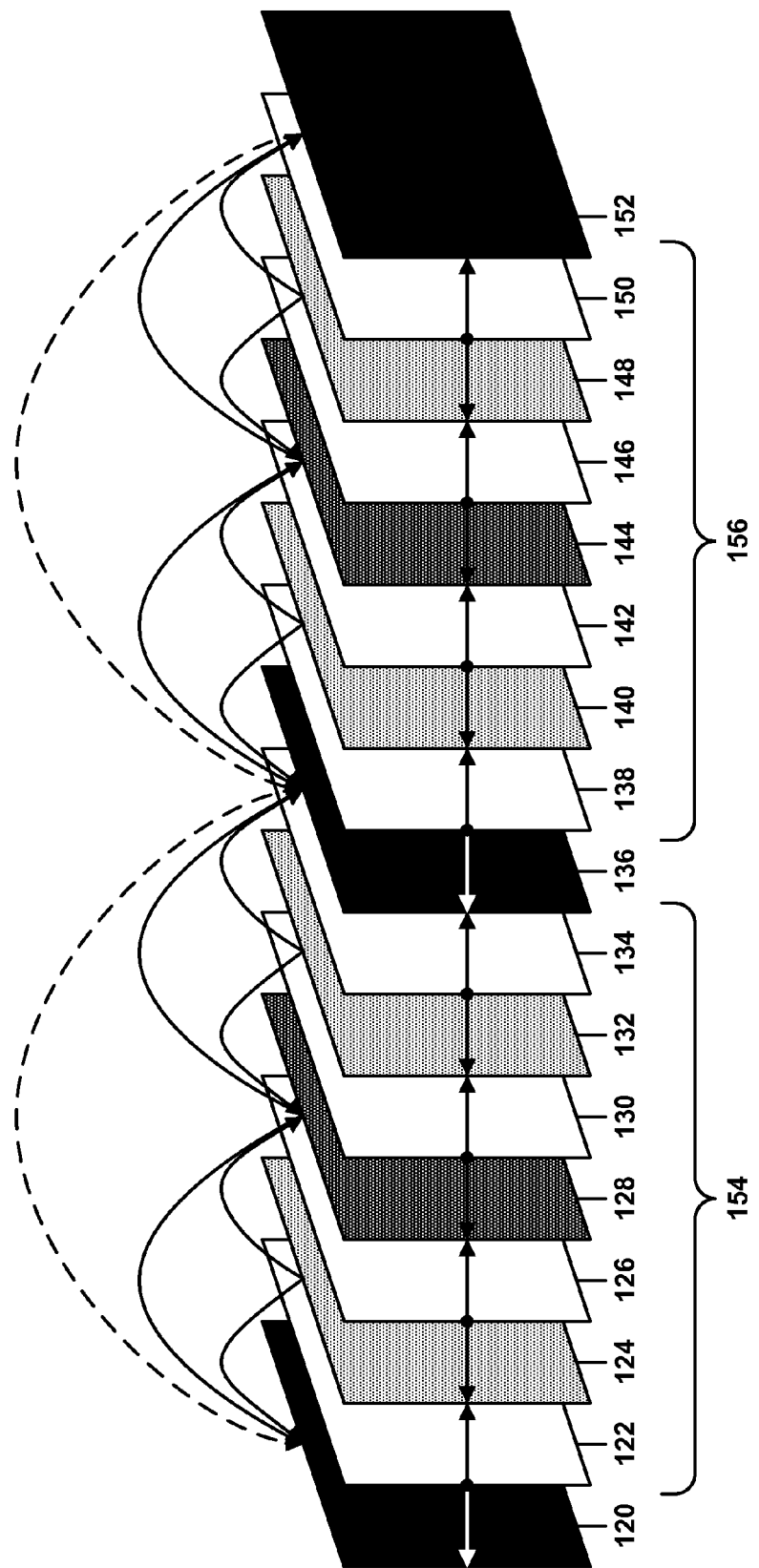
FIG. 5 is a conceptual diagram illustrating a sequence of coded video pictures.

FIG. 5 is a conceptual diagram illustrating a sequence of coded video pictures 120-152. The pictures are shaded differently to indicate positions within a hierarchical prediction structure. For example, pictures 120, 136, and 152 are shaded black to represent that pictures 120, 136, 152 are at the top of the hierarchical prediction structure. Pictures 120, 136, 152 may comprise, for example, intra-coded pictures or inter-coded pictures that are predicted from other pictures in a single direction (e.g., P-pictures). When intra-coded, pictures 120, 136, 152 are predicted solely from data within the same picture. When inter-coded, picture 136, for example, may be coded relative to data of picture 120, as indicated by the dashed arrow from picture 136 to picture 120. Pictures 136, 152 form key pictures of groups of pictures (GOPs) 154, 156, respectively.

Pictures 128, 144 are darkly shaded to indicate that they are next in the encoding hierarchy following pictures 120, 136, and 152. Pictures 128, 144 may comprise bi-directional, inter-mode prediction encoded pictures. For example, picture 128 may be predicted from data of pictures 120 and 136, while picture 144 may be predicted from pictures 136 and 152. Pictures 124, 132, 140, and 148 are lightly shaded to indicate that they are next in the encoding hierarchy following pictures 128 and 144. Pictures 124, 132, 140, and 148 may also comprise bi-directional, inter-mode prediction encoded pictures. For example, picture 124 may be predicted from pictures 120 and 128, picture 132 may be predicted from pictures 128 and 136, picture 140 may be predicted from picture 136 and 144, and picture 148 may be predicted from picture 144 and 152. In general, pictures that are lower in the hierarchy may be encoded from any reference pictures that are higher in the hierarchy, assuming that the reference pictures are still buffered in a decoded picture buffer, and assuming that the reference pictures were coded earlier than the picture currently being coded.

Finally, pictures 122, 126, 130, 134, 138, 142, 146, and 150 are shaded white to indicate that these pictures are last in the encoding hierarchy. Pictures 122, 126, 130, 134, 138, 142, 146, and 150 may be bi-directional, inter-mode prediction encoded pictures. Picture 122 may be predicted from pictures 120 and 124, picture 126 may be predicted from pictures 124 and 128, picture 130 may be predicted from pictures 128 and 132, picture 134 may be predicted from pictures 132 and 136, picture 138 may be predicted from picture 136 and 140, picture 142 may be predicted from pictures 140 and 144, picture 146 may be predicted from pictures 144 and 148, and picture 150 may be predicted from pictures 148 and 152. Again, it should be understood that pictures lower in the coding hierarchy may be coded from other pictures that are higher in the coding hierarchy. For example, any or all of pictures 122, 126, 130, or 134 may be predicted relative to any of pictures 120, 136, or 128, in addition or in the alternative.

Pictures 120-152 are illustrated in display order. That is, following decoding, picture 120 is displayed before picture 122, picture 122 is displayed before picture 124, and so on. As discussed above, POC values generally describe a display order for pictures, which is also substantially the same as the order in which raw pictures were captured or generated prior to being encoded. However, due to the encoding hierarchy, pictures 120-152 may be decoded in a different order. Moreover, while being encoded, pictures 120-152 may be arranged in decoding order in a bitstream including encoded data for pictures 120-152. For example, picture 136 may be displayed last among pictures of GOP 154. However, due to the encoding hierarchy, picture 136 may be decoded first of GOP 154. That is, in order to properly decode picture 128, for example, picture 136 may need to be decoded first, in order to act as a reference picture for picture 128. Likewise, picture 128 may act as a reference picture for pictures 124, 126, 130, and 132, and therefore may need to be decoded before pictures 124, 126, 130, and 132.

Furthermore, certain pictures may be treated as long-term reference pictures, while other pictures may be treated as short-term reference pictures. Suppose, for example, that pictures 120 and 136 represent long-term reference pictures, while pictures 128, 124, and 132 represent short-term reference pictures. It may be the case, in this example, that pictures 122 and 126 may be predicted relative to any of pictures 120, 136, 128, or 124, but that pictures 130 and 134 may be predicted relative to any of pictures 120, 136, 128, or 132. In other words, picture 124 may not be available for reference when coding pictures 130 and 134. As another example, assuming that pictures 120 and 136 represent long-term reference pictures and pictures 128, 124, and 132 represent short-term reference pictures, pictures 128, 124, and 132 may not be available for reference when coding pictures 138, 142, 146, and 150.

Video encoder 20 and video decoder 30 may be configured to inter-code all or portions of pictures 122-134, 138-150, and potentially picture 136 and/or picture 152, using a reference picture set. For instance, after coding pictures 120, 136, and 152, video encoder 20 and video decoder 30 may code picture 128. Thus, pictures 120, 136, and/or 152 may be included in a reference picture set for picture 128. After coding picture 128, video encoder 20 and video decoder 30 may proceed to code picture 124. Thus, pictures 120, 136, 152, and/or 128 may be included in the reference picture set for picture 124.

In accordance with the techniques of this disclosure, a video coder, e.g., video encoder 20 and/or video decoder 30, may code most significant bits (MSBs) of picture order count (POC) values of long-term reference pictures (LTRPs) using reference POC values. That is, video coders may determine a reference POC value and code a value representative of the difference between MSBs for the reference POC value and MSBs of an LTRP POC value. Video coders may further determine that the reference POC value corresponds to a picture that must have been received in order to properly decode a current picture, that is, a picture for which the LTRP is used as a reference picture and that is currently being coded. The reference POC value may, additionally or alternatively, correspond to a picture that must have been received in order for a bitstream including the current picture and the LTRP to conform to an applicable video coding standard, e.g., HEVC.

For instance, the reference POC value may correspond to the current picture itself. Of course, in order to properly decode a current picture, data for the current picture must have been received. As another example, the reference POC value may correspond to a most recent (in decoding order) random access point (RAP) picture. Assuming that the current picture is an inter-coded picture, then the current picture will be predicted from the RAP picture or from another picture that is predicted, directly or indirectly, from the RAP picture. Other examples of pictures to which the reference POC may correspond are other intra-coded pictures, including other RAP pictures, as well as other pictures from which the current picture depends (e.g., is predicted, directly or indirectly).

Assume, for example, that the current picture is picture 132, and that picture 128 is a long-term reference picture for picture 132. In the example of FIG. 5, picture 136 may act as a RAP picture. Picture 120 may also act as a RAP picture, but in this example, picture 136 may be considered the most recent RAP picture, in decoding order, with respect to picture 132. Accordingly, a video coder may determine MSBs for a POC value of picture 128 and code the difference between the MSBs for the POC value of picture 128 and MSBs for a POC value of a picture for which data must have been received in order to properly decode picture 132, e.g., picture 132 itself or picture 136.

In addition, the video coder may code a syntax element indicative of whether the MSBs of picture 128 (a LTRP, in this example) are predicted from a POC value of picture 136 (the most recent RAP picture in decoding order, in this example) or from picture 132 (the current picture, in this example). That is, the syntax element may indicate whether the picture for which data must have been received in order to properly decode picture 132 is picture 132 itself or picture 136. For example, video encoder 20 may determine whether to use the POC value for picture 132 or the POC value for picture 136 as a reference POC value when coding the MSBs of the POC value for picture 132. Video encoder 20 may select one of the two pictures based on, e.g., which of these two pictures yields a lowest POC difference value. Video encoder 20 may then code a value for the syntax element indicative of which of the pictures will be used for obtaining the reference POC value. Video encoder 20 may then use the POC value for the indicated picture as the reference POC value, that is, by calculating the difference between the MSBs of the POC value for picture 128 and the MSBs of the POC value for the indicated picture. Video decoder 30, similarly, may use the syntax element to determine which of the pictures from which to obtain the reference POC value, and reproduce the POC value for picture 128 by adding the decoded difference value to the MSBs of the POC value for the indicated picture.

A video coder may code the syntax element in one of a variety of locations. For instance, the video coder may code the syntax element in a slice header of a slice of the current picture (picture 132, in the example above). Examples of slice headers that may be used to code the syntax element are discussed above with respect to Tables 1, 3, and 5. In Tables 1, 3, and 5, delta_poc_lt_curr_pic_flag[i] represents an example of the syntax element discussed above (i.e., the syntax element that is indicative of whether the MSBs of a LTRP are predicted from a POC value of the most recent RAP picture in decoding order or from the current picture). The index value i corresponds to the current picture, e.g., picture 132. As shown in Tables 1, 3, and 5, the video coder need not code a value for the delta_poc_msb_present_flag[i], and indeed, may omit coding a value for this syntax element. That is, the slice header need not include the syntax element delta_poc_msb_present_flag[i].

Alternatively, the video coder may code the syntax element indicative of whether the MSBs of a LTRP are predicted from a POC value of the most recent RAP picture in decoding order or from the current picture in a parameter set, such as a picture parameter set (PPS), sequence parameter set (SPS), video parameter set (VPS), or other parameter set.

The video coder may further code a value representative of LSBs for the POC value of the LTRP (picture 128 in the example described above). For example, video encoder 20 may dissect the POC value for picture 128 into the MSBs and the LSBs, encode the MSBs using the difference value as described above, and encode the LSBs, e.g., using entropy encoding techniques. Video decoder 30, on the other hand, may decode the MSBs using the difference value, the LSBs, and then concatenate the MSBs and the LSBs to reproduce the POC value for picture 128. Video decoder 30 may further add picture 128 to a reference picture set, based on the reproduced POC value for picture 128. It should be understood that the difference value and the LSBs may be coded in a slice header of a slice of the current picture, e.g., picture 132. After adding the LTRP to the reference picture set, video decoder 30 may use reference picture list construction techniques (and potentially reference picture list modification techniques) to create and/or modify a reference picture list from the reference picture set, which video decoder 30 may ultimately use to decode the current picture, e.g., picture 132.

Figure 6:
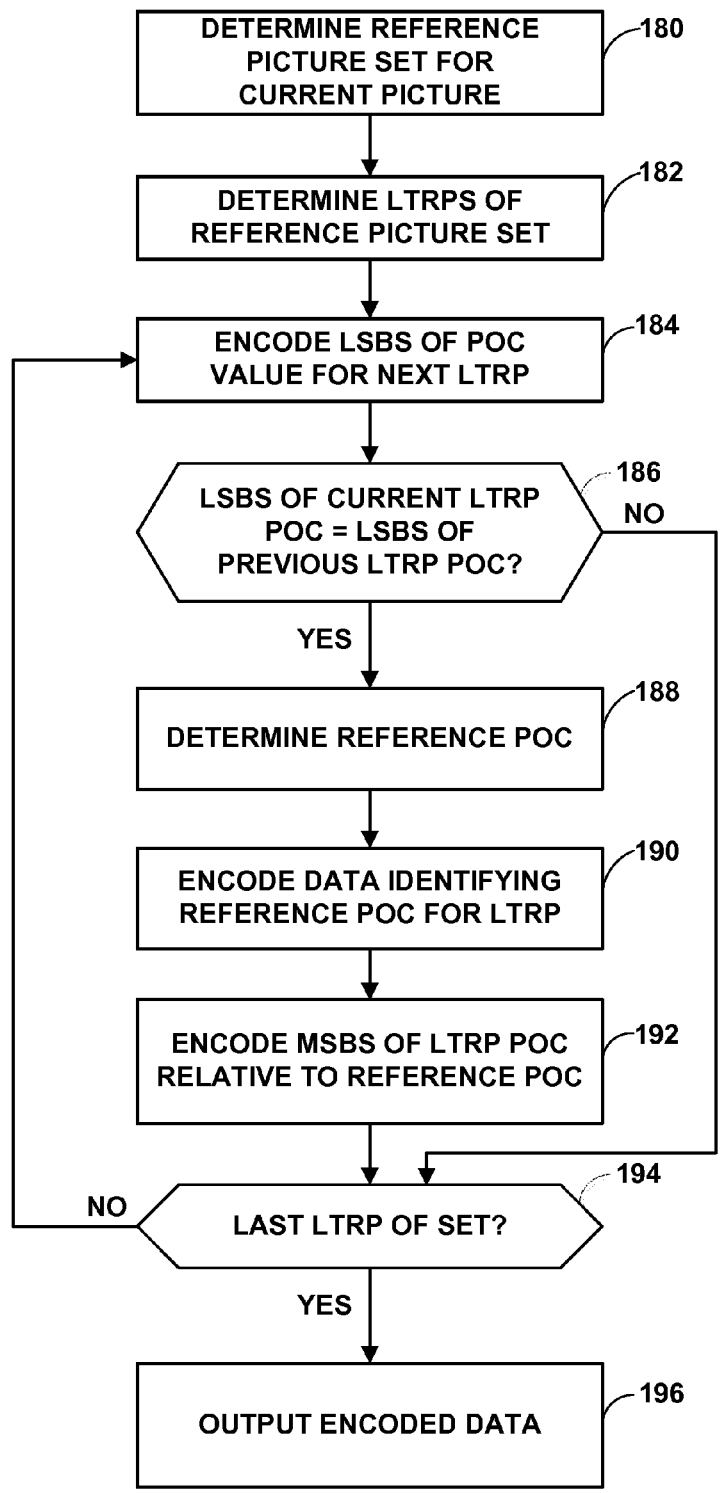
FIG. 6 is a flowchart illustrating an example method for encoding data representative of pictures to be included in a reference picture set.

FIG. 6 is a flowchart illustrating an example method for encoding data representative of pictures to be included in a reference picture set. In particular, FIG. 6 represents an example of a method for encoding most-significant bits (MSBs) of a long-term reference picture (LTRP) using predictive coding techniques. That is, the method of FIG. 6 may include predicting the MSBs of an LTRP from the MSBs of a picture for which data must have been received in order to decode a current picture (e.g., the current picture itself or a most recent random access point (RAP) picture. Although primarily described as being performed by video encoder 20, it should be understood that the method of FIG. 6 may be performed by other devices, e.g., transcoding device 106 of FIG. 4 or routing devices 104A, 104B of FIG. 4.

Initially, video encoder 20 may determine a reference picture set for a current picture (180). For example, video encoder 20 may perform multiple encoding passes to determine how each block (e.g., each CU) of the current picture should be encoded, including which potential reference picture should be used as a reference picture for encoding the block. Video encoder 20 may use rate-distortion optimization (RDO) techniques to determine which of a set of possible reference pictures should be used as the reference picture for a particular block. Video encoder 20 may ultimately construct a reference picture set including the determined reference pictures. Although not shown in FIG. 6, video encoder 20 may also construct one or more reference picture lists for the current picture from the reference picture set (or from distinct reference picture sets), and encode motion information for each block that indicates, Video encoder 20 may also determine which of the reference pictures included in the reference picture set, if any, are long-term reference pictures (LTRPs) (182). In general, video encoder 20 may determine that a reference picture should be considered an LTRP when the reference picture is used for reference by multiple pictures that are subsequent to the LTRP in decoding order. Again, it should be understood that video encoder 20 may execute multiple encoding passes, across several pictures, to determine whether a reference picture is best considered an LTRP. Some reference pictures may be considered LTRPs by default, e.g., the RAP picture. In some examples, video encoder 20 may encode a value representative of the number of LTRPs included in the reference picture set, e.g., num_long_term_pics in Tables 1, 3, and 5.

Video encoder 20 may then encode least-significant bits (LSBs) of the POC value for a next LTRP of the reference picture set (184). The first LTRP may be considered the "next" LTRP before any LSBs of POC values for LTRPs have been coded; otherwise, video encoder 20 may iterate through the set of LTRPs included in the reference picture set to encode the LSBs of the POC values for the LTRPs.

Video encoder 20 may also determine whether the LSBs of the POC value for the current LTRP are the same as the LSBs of a POC value for any previous LTRP (186). If the LSBs of the POC value for the current LTRP are the same as the LSBs of the POC value for at least one previous LTRP ("YES" branch of 186), video encoder 20 may encode the most-significant bits (MSBs) of the POC value for the current LTRP. In particular, in accordance with the techniques of this disclosure, video encoder 20 may determine a reference POC value (188), e.g., either the POC value of the current picture or the POC value of the most recent RAP picture, in encoding order, to the current picture.

Video encoder 20 may determine which of these POC values to use as a reference POC value based on which produces the smallest POC difference relative to the MSBs of the POC value for the current LTRP. Video encoder 20 may then encode data that identifies the reference POC for the LTRP (190), e.g., a value for delta_poc_lt_curr_pic_flag [i] in accordance with Tables 1, 3, and/or 5 as discussed above. In other examples, video encoder 20 may encode this information in an SPS, PPS, or other data structure. Video encoder 20 may also encode the MSBs of the POC value for the current LTRP relative to the reference POC value (192). That is, video encoder 20 may calculate the difference between the MSBs of the POC value for the current LTRP and the MSBs of the reference POC value, then encode this difference.

On the other hand, if the LSBs of the POC value for the current LTRP are not the same as the LSBs of the POC values for all of the previous LTRPs ("NO" branch of 186), or after encoding the MSBs of the LTRP, video encoder 20 may determine whether the current LTRP of the reference picture set is the last LTRP of the reference picture set (194). If not (i.e., if there are more LTRPs in the reference picture set for which POC values have not yet been encoded) ("NO" branch of 194), video encoder 20 may encode the POC value of the next LTRP in the reference picture set. However, after all POC values for all LTRPs in the reference picture set have been encoded ("YES" branch of 194), video encoder 20 may output the encoded data (196).

In this manner, the method of FIG. 6 represents an example of a method of encoding video data including encoding at least a portion of a current picture relative to a long-term reference picture (LTRP), determining an LTRP picture order count (POC) value for the LTRP, and encoding a value representative of a difference between most significant bits (MSBs) of a reference POC value and MSBs of the LTRP POC value, wherein the reference POC value corresponds to a picture for which data must be received in order to properly decode the current picture.

Figure 7:
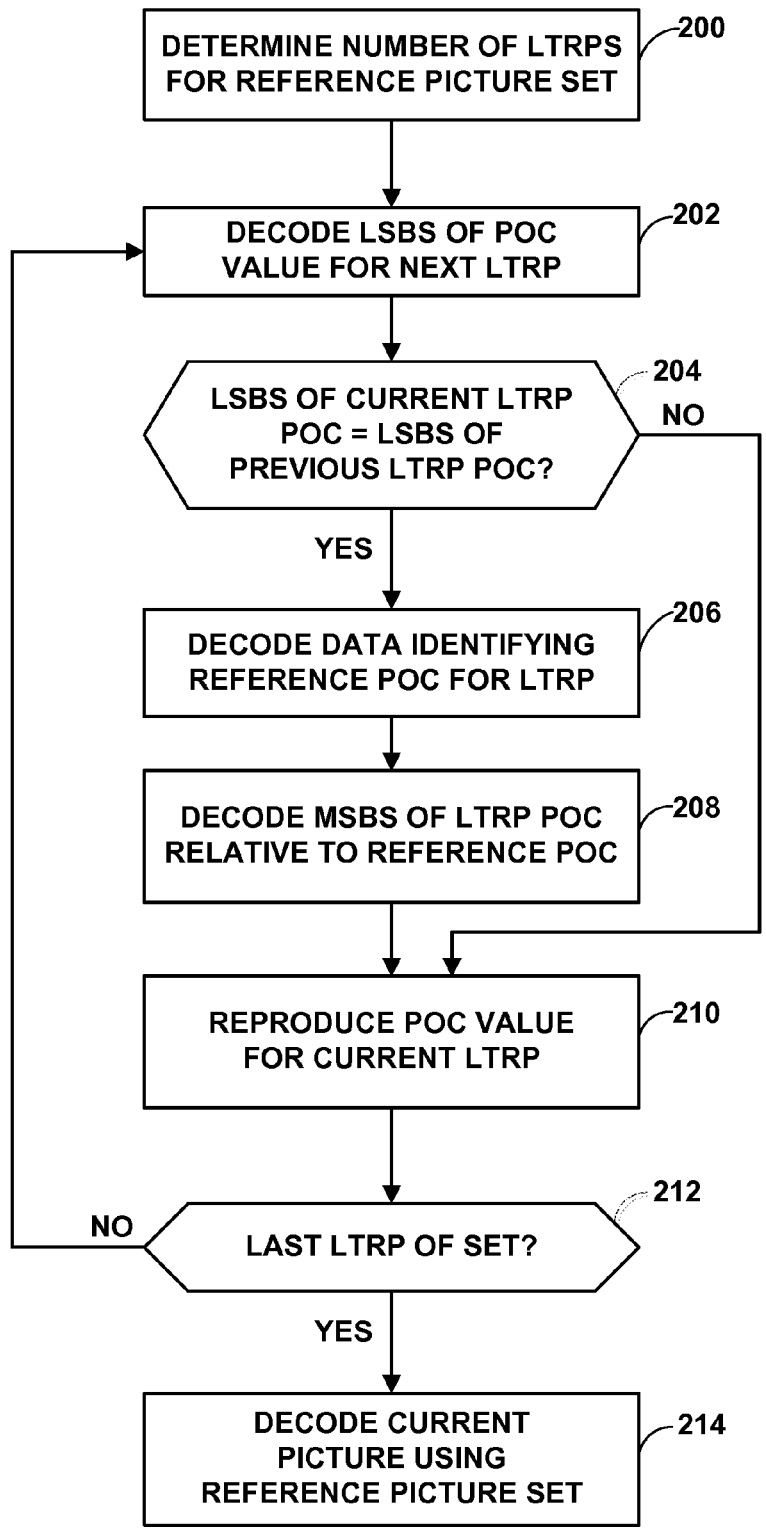
FIG. 7 is a flowchart illustrating an example method for decoding data representative of pictures to be included in a reference picture set.

FIG. 7 is a flowchart illustrating an example method for decoding data representative of pictures to be included in a reference picture set. In particular, FIG. 7 represents an example of a method for decoding most-significant bits (MSBs) of a long-term reference picture (LTRP) using predictive coding techniques. That is, the method of FIG. 7 may include predicting the MSBs of an LTRP from the MSBs of a picture for which data must have been received in order to decode a current picture (e.g., the current picture itself or a most recent random access point (RAP) picture. Although primarily described as being performed by video decoder 30, it should be understood that the method of FIG. 7 may be performed by other devices, e.g., transcoding device 106 of FIG. 4 or routing devices 104A, 104B of FIG. 4.

Initially, video decoder 30 may determine a number of LTRPs to be included in a reference picture set for a current picture (200). For example, video decoder 30 may decode a num_long_term_pics syntax element for the current picture, in accordance with Tables 1, 3, and 5. In other examples, video decoder 30 may decode this information from an SPS, PPS, or other data structure. Video decoder 30 may then decode LSBs of the POC value for a next LTRP (202). The next LTRP may correspond to a reference picture which is indicated as being used for long-term reference, e.g., in a NAL unit header of a NAL unit that encapsulates data for the reference picture.

Video decoder 30 may then determine whether the LSBs of the POC value for the current LTRP are the same as the LSBs of a POC value for any previous LTRP (204). If the LSBs of the POC value for the current LTRP are the same as the LSBs of the POC value for at least one previous LTRP ("YES" branch of 204), video decoder 30 may decode the most-significant bits (MSBs) of the POC value for the current LTRP. In particular, in accordance with the techniques of this disclosure, video decoder 30 may decode data that identifies a reference POC for the LTRP (206), e.g., a value for delta_poc_lt_curr_pic_flag[i] in accordance with Tables 1, 3, and/or 5 as discussed above. This value may identify a picture for which data must have been received in order to properly decode the current picture, e.g., the current picture itself or the most recent RAP picture.

Video decoder 30 may then decode the MSBs of the POC value for the LTRP relative to the reference POC value (208). That is, video decoder 30 may add a decoded difference value and then add the decoded difference value to the MSBs of the reference POC value to reproduce the MSBs of the POC value for the current LTRP. Video decoder 30 may further reproduce the POC value for the current LTRP, e.g., by concatenating the MSBs of the POC value for the current LTRP with the LSBs of the POC value for the current LTRP (210). Video decoder 30 may then add the POC value for the LTRP to the reference picture set.

Video decoder 30 may then determine whether the most recent LTRP is the last LTRP of the reference picture set (212). If not ("NO" branch of 212), video decoder 30 may decode the POC value of the next LTRP. After POC values for all LTRPs have been decoded and the LTRPs have been added to the reference picture set ("YES" branch of 212), video decoder 30 may decode the current picture using the reference picture set (214). For instance, video decoder 30 may generate a reference picture list from the reference picture set. Video decoder 30 may then decode motion information for each inter-predicted block of the current picture, which may include a reference picture list identifier and/or a reference index into the reference picture list, to determine a reference picture for the respective block.

In this manner, the method of FIG. 7 represents an example of a method of decoding video data including decoding a value representative of a difference between most significant bits (MSBs) of a reference picture order count (POC) value and MSBs of a long-term reference picture (LTRP) POC value, wherein the reference POC value corresponds to a picture for which data must have been received in order to properly decode a current picture, determining the MSBs of the LTRP POC value based on the decoded value and the reference POC value, and decoding at least a portion of the current picture relative to the LTRP based at least in part on the LTRP POC value.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

In still other examples, this disclosure contemplates a computer readable medium comprising a data structure stored thereon, wherein the data structure includes an encoded bitstream consistent with this disclosure. In particular, the data structures may include the NAL unit designs described herein.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding a value representative of a difference between most significant bits (MSBs) of a reference picture order count (POC) value and MSBs of a long-term reference picture (LTRP) POC value, wherein the reference POC value corresponds to a POC value of a current picture or a POC value of a random access point (RAP) picture that precedes the current picture in decoding order;
    determining the MSBs of the LTRP POC value based on the decoded value and the reference POC value; and
    decoding at least a portion of the current picture relative to the LTRP based at least in part on the LTRP POC value.

2. The method of claim 1, further comprising:
    decoding a syntax element indicative of whether the MSBs of the LTRP POC value are predicted from the POC value for the RAP picture or the POC value for the current picture; and
    reproducing the MSBs of the POC value for the LTRP based on the decoded value and the syntax element.

3. The method of claim 2, wherein reproducing the MSBs of the POC value for the LTRP comprises:
    when the syntax element indicates that the POC value for the LTRP is predicted from the POC value of the current picture, adding the MSBs POC difference value to the POC value of the current picture to reproduce the MSBs of the POC value for the LTRP; and
    when the syntax element indicates that the POC value for the LTRP is predicted from the POC value of the RAP picture, adding the MSBs POC difference value to the POC value of the RAP picture to reproduce the MSBs of the POC value for the LTRP.

4. The method of claim 2, wherein the syntax element comprises delta_poc_lt_curr_pic_flag[i], wherein i represents an index corresponding to the LTRP.

5. The method of claim 2, wherein decoding the syntax element comprises decoding a slice header for a slice of the current picture, wherein the slice header includes the syntax element.

6. The method of claim 5, wherein decoding the slice header comprises decoding the slice header without decoding a delta_poc_msb_present_flag[i].

7. The method of claim 5, wherein the slice header does not include a delta_poc_msb_present_flag[i].

8. The method of claim 2, further comprising, when the syntax element is not present for a subsequent picture, determining that there are no long-term reference pictures for the subsequent picture.

9. The method of claim 1, wherein decoding the value comprises decoding at least one of a slice header of a slice of the current picture, a sequence parameter set (SPS) for a sequence of pictures including the current picture, and a picture parameter set (PPS) for the current picture.

10. The method of claim 1, wherein the RAP picture comprises a latest RAP picture, in decoding order, that precedes the current picture in decoding order.

11. The method of claim 1, wherein the reference POC value corresponds to the POC value of the current picture.

12. The method of claim 1, further comprising:
    decoding least significant bits (LSBs) of the LTRP POC value;
    concatenating the MSBs of the LTRP POC value with the LSBs of the LTRP POC value to reproduce the LTRP POC value; and
    adding the LTRP to a reference picture set based on the reproduced LTRP POC value.

13. A method of encoding video data, the method comprising:
    encoding at least a portion of a current picture relative to a long-term reference picture (LTRP);
    determining an LTRP picture order count (POC) value for the LTRP; and
    encoding a value representative of a difference between most significant bits (MSBs) of a reference picture order count (POC) value and MSBs of the LTRP POC value, wherein the reference POC value corresponds to a POC value of a current picture or a POC value of a random access point (RAP) picture that precedes the current picture in decoding order.

14. The method of claim 13, further comprising encoding a syntax element indicative of whether the MSBs of the LTRP POC value are predicted from the POC value for the RAP picture or the POC value for the current picture.

15. The method of claim 14, wherein encoding the syntax element comprises encoding a slice header for a slice of the current picture, wherein the slice header includes the syntax element.

16. The method of claim 14, further comprising:
    determining that there are no long-term reference pictures for a subsequent picture; and
    based on the determination, skipping coding of the syntax element for the subsequent picture.

17. The method of claim 13, wherein encoding the value comprises encoding at least one of a slice header of a slice of the current picture, a sequence parameter set (SPS) for a sequence of pictures including the current picture, and a picture parameter set (PPS) for the current picture.

18. The method of claim 13, wherein the RAP picture comprises a latest RAP picture, in decoding order, that precedes the current picture in decoding order.

19. The method of claim 13, wherein the reference POC value corresponds to the POC value of the current picture.

20. A device for decoding video data, the device comprising:
    a memory configured to store video data; and
    a video decoder configured to:

decode a value representative of a difference between most significant bits (MSBs) of a reference picture order count (POC) value and MSBs of a long-term reference picture (LTRP) POC value, wherein the reference POC value corresponds to a POC value of a current picture or a POC value of a random access point (RAP) picture that precedes the current picture in decoding order, determine the MSBs of the LTRP POC value based on the decoded value and the reference POC value, and decode at least a portion of the current picture relative to the LTRP based at least in part on the LTRP POC value.

21. The device of claim 20, wherein the video decoder is further configured to decode a syntax element indicative of whether the MSBs of the LTRP POC value are predicted from the POC value for the RAP picture or the POC value for the current picture, and reproduce the MSBs of the POC value for the LTRP based on the decoded value and the syntax element.

22. The device of claim 21, wherein to reproduce the MSBs of the POC value for the LTRP, the video decoder is configured to, when the syntax element indicates that the POC value for the LTRP is predicted from the POC value of the current picture, add the MSBs POC difference value to the POC value of the current picture to reproduce the MSBs of the POC value for the LTRP, and when the syntax element indicates that the POC value for the LTRP is predicted from the POC value of the RAP picture, add the MSBs POC difference value to the POC value of the RAP picture to reproduce the MSBs of the POC value for the LTRP.

23. The device of claim 21, wherein the syntax element comprises delta_poc_lt_curr_pic_flag[i], wherein i represents an index corresponding to the LTRP.

24. The device of claim 21, wherein the video decoder is configured to decode a slice header for a slice of the current picture, wherein the slice header includes the syntax element.

25. The device of claim 24, wherein the video decoder is configured to decode the slice header without decoding a delta_poc_msb_present_flag[i].

26. The device of claim 24, wherein the slice header does not include a delta_poc_msb_present_flag[i].

27. The device of claim 21, wherein the video decoder is further configured to determine, when the syntax element is not present for a subsequent picture, that there are no long-term reference pictures for the subsequent picture.

28. The device of claim 20, wherein to decode the value, the video decoder is configured to decode at least one of a slice header of a slice of the current picture, a sequence parameter set (SPS) for a sequence of pictures including the current picture, and a picture parameter set (PPS) for the current picture.

29. The device of claim 20, wherein the RAP picture comprises a latest RAP picture, in decoding order, that precedes the current picture in decoding order.

30. The device of claim 20, wherein the reference POC value corresponds to the POC value of the current picture.

31. The device of claim 20, wherein the video decoder is further configured to decode least significant bits (LSBs) of the LTRP POC value, concatenate the MSBs of the LTRP POC value with the LSBs of the LTRP POC value to reproduce the LTRP POC value, and add the LTRP to a reference picture set based on the reproduced LTRP POC value.

32. A device for decoding video data, the device comprising:

means for decoding a value representative of a difference between most significant bits (MSBs) of a reference picture order count (POC) value and MSBs of a long-term reference picture (LTRP) POC value, wherein the reference POC value corresponds to a POC value of a current picture or a POC value of a random access point (RAP) picture that precedes the current picture in decoding order;

means for determining the MSBs of the LTRP POC value based on the decoded value and the reference POC value; and means for decoding at least a portion of the current picture relative to the LTRP based at least in part on the LTRP POC value.

33. The device of claim 32, further comprising:

means for decoding a syntax element indicative of whether the MSBs of the LTRP POC value are predicted from the POC value for the RAP picture or the POC value for the current picture; and means for reproducing the MSBs of the POC value for the LTRP based on the decoded value and the syntax element.

34. The device of claim 33, wherein the means for reproducing the MSBs of the POC value for the LTRP comprises:

means for adding, when the syntax element indicates that the POC value for the LTRP is predicted from the POC value of the current picture, the MSBs POC difference value to the POC value of the current picture to reproduce the MSBs of the POC value for the LTRP; and means for adding, when the syntax element indicates that the POC value for the LTRP is predicted from the POC value of the RAP picture, the MSBs POC difference value to the POC value of the RAP picture to reproduce the MSBs of the POC value for the LTRP.

35. The device of claim 33, further comprising means for determining, when the syntax element is not present for a subsequent picture, that there are no long-term reference pictures for the subsequent picture.

36. The device of claim 32, wherein the means for decoding the value comprises means for decoding at least one of a slice header of a slice of the current picture, a sequence parameter set (SPS) for a sequence of pictures including the current picture, and a picture parameter set (PPS) for the current picture.

37. The device of claim 32, wherein the RAP picture comprises a latest RAP picture, in decoding order, that precedes the current picture in decoding order.

38. The device of claim 32, wherein the reference POC value corresponds to the POC value of the current picture.

39. A non-transitory computer-readable storage medium having stored thereon instructions that, when executed, cause a processor to:

decode a value representative of a difference between most significant bits (MSBs) of a reference picture order count (POC) value and MSBs of a long-term reference picture (LTRP) POC value, wherein the reference POC value corresponds to a POC value of a current picture or a POC value of a random access point (RAP) picture that precedes the current picture in decoding order;

determine the MSBs of the LTRP POC value based on the decoded value and the reference POC value; and decode at least a portion of the current picture relative to the LTRP based at least in part on the LTRP POC value.

40. The non-transitory computer-readable storage medium of claim 39, further comprising instructions that cause the processor to:
  decode a syntax element indicative of whether the MSBs of the LTRP POC value are predicted from the POC value for the RAP picture or the POC value for the current picture; and
  reproduce the MSBs of the POC value for the LTRP based on the decoded value and the syntax element.

41. The non-transitory computer-readable storage medium of claim 40, wherein the instructions that cause the processor to reproduce the MSBs of the POC value for the LTRP comprise instructions that cause the processor to:
  when the syntax element indicates that the POC value for the LTRP is predicted from the POC value of the current picture, add the MSBs POC difference value to the POC value of the current picture to reproduce the MSBs of the POC value for the LTRP; and
  when the syntax element indicates that the POC value for the LTRP is predicted from the POC value of the RAP picture, add the MSBs POC difference value to the POC value of the RAP picture to reproduce the MSBs of the POC value for the LTRP.

42. The non-transitory computer-readable storage medium of claim 39, further comprising instructions that cause the processor to, when the syntax element is not present for a subsequent picture, determine that there are no long-term reference pictures for the subsequent picture.

43. The non-transitory computer-readable storage medium of claim 39, wherein the instructions that cause the processor to decode the value comprise instructions that cause the processor to decode at least one of a slice header of a slice of the current picture, a sequence parameter set (SPS) for a sequence of pictures including the current picture, and a picture parameter set (PPS) for the current picture.

44. The non-transitory computer-readable storage medium of claim 39, wherein the RAP picture comprises a latest RAP picture, in decoding order, that precedes the current picture in decoding order.

45. The non-transitory computer-readable storage medium of claim 39, wherein the reference POC value corresponds to the POC value of the current picture.

* * * * *